United States Patent
Song

(10) Patent No.: US 9,693,180 B2
(45) Date of Patent: Jun. 27, 2017

(54) METHOD AND APPARATUS FOR TRANSMITTING AND RECEIVING AUDIO STREAMS IN WIRELESS COMMUNICATION SYSTEM

(71) Applicant: LG ELECTRONICS INC., Seoul (KR)

(72) Inventor: Jonghun Song, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/153,350

(22) Filed: May 12, 2016

(65) Prior Publication Data

US 2017/0078836 A1    Mar. 16, 2017

Related U.S. Application Data

(60) Provisional application No. 62/217,870, filed on Sep. 12, 2015.

(51) Int. Cl.
| | |
|---|---|
| *H04B 7/00* | (2006.01) |
| *H04W 4/00* | (2009.01) |
| *H04W 68/02* | (2009.01) |
| *H04W 8/22* | (2009.01) |

(52) U.S. Cl.
CPC ............. *H04W 4/008* (2013.01); *H04W 8/22* (2013.01); *H04W 68/02* (2013.01)

(58) Field of Classification Search
CPC ....... H04W 4/008; H04W 8/22; H04W 68/02; H04W 84/18; H04W 1/7253; H04W 8/005; H04W 88/06; H04W 76/02; H04W 88/02; H04W 4/02
USPC ....... 455/41.2, 418–420, 422.1, 432.1, 435.1
See application file for complete search history.

(56) References Cited

U.S. PATENT DOCUMENTS

| | | | | |
|---|---|---|---|---|
| 2004/0076145 | A1* | 4/2004 | Kauhanen | H04L 29/06027 370/352 |
| 2011/0265139 | A1* | 10/2011 | Singh | H04N 21/64322 725/116 |
| 2014/0044285 | A1* | 2/2014 | Kanigicherla | G06F 3/165 381/119 |
| 2014/0364103 | A1* | 12/2014 | Marti | H04W 4/021 455/418 |
| 2015/0351143 | A1* | 12/2015 | Seymour | H04M 1/72519 455/41.2 |

* cited by examiner

*Primary Examiner* — Nhan Le
(74) *Attorney, Agent, or Firm* — Birch, Stewart, Kolasch & Birch, LLP

(57) ABSTRACT

In a method for transceiving audio streams in a wireless communication system according to the present invention, a method performed by a first device comprises performing an audio link connection procedure related to transceiving an audio stream with a second device, the audio link including at least one isochronous channel; transceiving an audio stream to and from the second device through the at least one isochronous channel; and transmitting a command message to the second device to perform a specific function related to the audio stream.

8 Claims, 17 Drawing Sheets

(a)

(b)

(a)

(b)

(a)

(b)

METHOD AND APPARATUS FOR TRANSMITTING AND RECEIVING AUDIO STREAMS IN WIRELESS COMMUNICATION SYSTEM

CROSS-REFERENCE TO RELATED APPLICATIONS

This application claims priority to Provisional Application No. 62/217,870 filed on 12 Sep. 2015 in US the entire contents of which is hereby incorporated by reference in its entirety.

BACKGROUND OF THE INVENTION

Field of the Invention

The present invention is related to a wireless communication system and more specifically, a method for transmitting and receiving audio streams.

Discussion of the Related Art

Bluetooth is one of typical short range wireless technologies for exchanging information among various devices such as smart phones, PCs, earphones, and headphones.

Bluetooth technology is now adopted by most of smart phones, PCs, and notebooks; and is widely used for the convenience of use. The easy pairing process of Bluetooth technology provides reliable connectivity among different devices. A recent Bluetooth variant LE is capable of providing hundreds of kilobytes of information reliably while requiring considerably reduced power consumption.

The Bluetooth Core Specification comprises BR/EDR (Basic Rate/Enhanced Data Rate) and LE (Low Energy) version.

Of the two versions, Bluetooth Low Energy (in what follows, it is called 'BLE') is a subset of Bluetooth Specification v4.0, aimed for high energy efficiency compared with the former Bluetooth specifications.

SUMMARY OF THE INVENTION

The present invention defines a state machine for transmitting and receiving an audio stream through a Hearing Aid (HA).

Also, the present invention provides an objective for which various functions related to audio streams are performed at each state through the defined state machine.

Also, the present invention provides a method for receiving an alert sound intended for a disaster or an accident through an HA while an audio stream is transmitted or received.

Technical objects of the present invention are not limited to those objects described above; other technical objects not mentioned above can be clearly understood from what are described below by those skilled in the art to which the present invention belongs.

In a method for transmitting and receiving audio streams in a wireless communication system according to the present invention, a method carried out by a first device comprises performing an audio link connection procedure related to transmitting and receiving an audio stream with a second device, the audio link including at least one isochronous channel; transmitting and receiving an audio stream to and from the second device through the at least one isochronous channel; and transmitting a command message to the second device to perform a specific function related to the audio stream, wherein the specific function includes at least one of a first control function related to an incoming call or an outgoing call; a second control function related to audio listening; or a third control function related to audio stream handling.

Also, in the method according to the present invention, the state of the first device or the second device undergoes state transition from a first state to a second state according to the specific function.

Also, in the method according to the present invention, the first or the second state includes an idle state, activating state, and active state.

Also, the method according to the present invention further comprises receiving an alert sound having the highest priority through the at least one isochronous channel.

Also, the alert sound according to the present invention is received in the idle state, activating state, or active state.

Also, the method according to the present invention further comprises increasing power with respect to the alert sound in case an audio stream and an alert sound are received simultaneously through the at least one isochronous channel.

Also, the second control function according to the present invention is audio play, audio stop, audio pause, audio resume, move to the next song, move to the previous song, or volume adjust; and the third control function is audio link connection or audio link release.

Also, the audio link according to the present invention is established for in-band ringtone or out-of-band ringtone.

Also, the first device according to the present invention is a Hearing Aid (HA), and the second device according to the present invention is a user device.

Also, a first device transmitting and receiving audio streams in a wireless communication system according to the present invention comprises an RF unit for transmitting and receiving a signal to and from the outside in a wired and/or wireless manner; and a processor functionally connected to the RF unit, wherein the processor is configured to perform an audio link connection procedure related to transmitting and receiving an audio stream in conjunction with a second device, the audio link including at least one isochronous channel; to transmit and receive an audio stream to and from the second device through the at least one isochronous channel; and to transmit a command message to the second device to perform a specific function related to the audio stream, wherein the specific function includes at least one of a first control function related to an incoming call or an outgoing call; a second control function related to audio listening; or a third control function related to audio stream handling.

The present invention newly defines a state machine for transmitting and receiving an audio stream through an HA, thereby providing an advantageous effect of enabling the state machine to perform various functions related to audio streams.

Also, the present invention provides an advantageous effect of coping with an emergency situation by receiving an alert sound intended for a disaster or an accident through an HA while an audio stream is transmitted or received.

The advantageous effects that can be obtained from the present invention are not limited to those described above, and other effects not mentioned above can be understood clearly from the following descriptions by those skilled in the art to which the present invention belongs.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
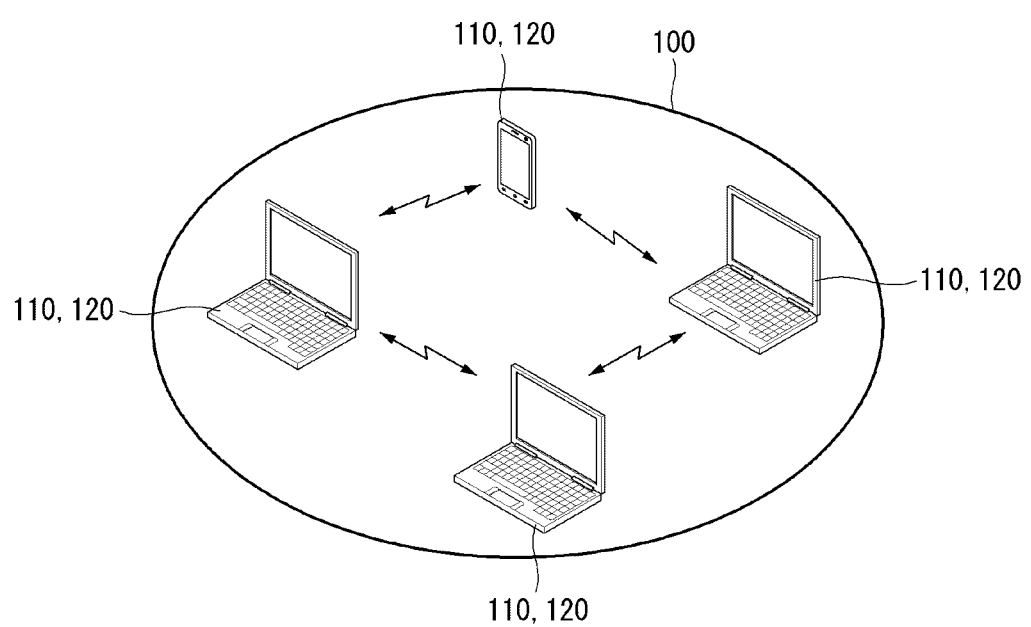
FIG. 1 illustrates one example of a wireless communication system which makes use of a Bluetooth low energy technology according to the present invention.

In what follows, the present invention will be described in more detail with reference to appended drawings.

A suffix such as "module" and "unit" introduced in the description below is assigned merely to facilitate description of this document, and the "module" and "unit" can be used interchangeably.

Meanwhile, a device according to this document refers to a device capable of wireless communication, including a mobile phone including a smartphone, tablet PC, desktop computer, notebook, and television including a smart TV and IPTV.

In what follows, embodiments of the present invention will be described in detail with reference to appended drawings and descriptions contained in the drawings, but the technical scope of the present invention is not restricted by the embodiments or limited to the embodiments.

Wherever possible, general terms widely used by the public have been chosen as long as the terms do not obscure their technical functions intended in the present invention; however, those terms can be changed by the intention of those skilled in the art, practices, or advent of a new technology.

In some case, specific terms are chosen arbitrarily; in that case, specific meaning of the corresponding terms will be elaborated at the corresponding description.

Therefore, the terms used in this document should be interpreted on the basis of their actual meaning and the description throughout the document rather than the immediate names of the terms.

FIG. 1 illustrates one example of a wireless communication system which makes use of a Bluetooth low energy technology according to the present invention.

The wireless communication system 100 comprises at least one server device 110 and at least one client device 120.

The server device and the client device perform Bluetooth communication by using Bluetooth Low Energy (in what follows, it is denoted as BLE for the purpose of convenience) technology.

First of all, compared with Bluetooth BR/EDR (Basic Rate/Enhanced Data Rate) technology, BLE technology requires a relatively small duty cycle. Products based on BLE technology can be manufactured at low costs and require considerably small power consumption through low speed data transmission rate; therefore, they can be operated more than one year with a coin cell battery.

Also, BLE technology simplifies a connection procedure between devices and requires a smaller packet size than Bluetooth BR/EDR technology.

Features of BLE technology can be summarized as follows: (1) the number of RF channels is 40, (2) the data transmission speed of 1 Mbps is supported, (3) star topology is used, (4) latency is 3 ms, (5) the maximum current is less than 15 mA, (6) the output power is less than 10 mW (10 dBm), and (7) main application fields include mobile phones, watch, sports, health-care, sensor, and device control.

The server device 110 can operate as a client device in a relationship with a different device, and similarly the client device can operate as a server device in a relationship with a different device. In other words, in the BLE communication system, a device can operate as a server device or a client device, and if needed, a device can operate as a server device and a client device at the same time.

The server device 110 can be called a data service device, master device, master, server, conductor, host device, audio source device, or first device. The client device can be called a slave device, slave, client, member, sink device, audio sink device, or second device.

The server device and the client device constitute a main part of the wireless communication system, and the wireless communication system can include other constituting elements in addition to the server device and the client device.

The server device refers to a device which receives data from a client, performs communication directly with the client device, and if receiving a data request from the client device, provides data to the client device through a response.

Also, the server device sends a notification message and indication message to the client device to provide data information to the client device. Also, when transmitting an indication message to the client device, the server device receives a confirm message corresponding to the indication message from the client device.

Also, the server device can provide data information to the user through a display unit or receive a request input from the user through a user input interface while transmitting and receiving a notification, indication, and confirm message to and from the client device.

Also, the server device can read data from a memory unit or write new data to the corresponding memory while transmitting and receiving a message to and from the client device.

Also, one server device can be connected to a plurality of client devices and can be easily re-connected to client devices by using bonding information.

The client device 120 refers to a device which requests data information and data transmission from a server device.

The client device receives data from the server device through a notification message and indication message and when receiving an indication message from the server device, sends a confirm message in response to the indication message.

In the same way as the server device, the client device can provide information to the user through a display unit or receive an input from the user through a user input interface while transmitting and receiving message to and from the server device.

Also, the client device can read data from a memory unit or write new data to the corresponding memory while transmitting and receiving a message to and from the server device.

Hardware components such as a display unit, user input interface, and memory unit of the server device and the client device will be described in detail with reference to FIG. 2.

Also, the wireless communication system can form a Personal Area Network (PAN) by using Bluetooth technology. As one example, the wireless communication system can exchange files and documents in a prompt and safe manner by forming a private piconet among devices.

A BLE device can operate to support various Bluetooth-related protocols, profiles, and processes.

Figure 2:
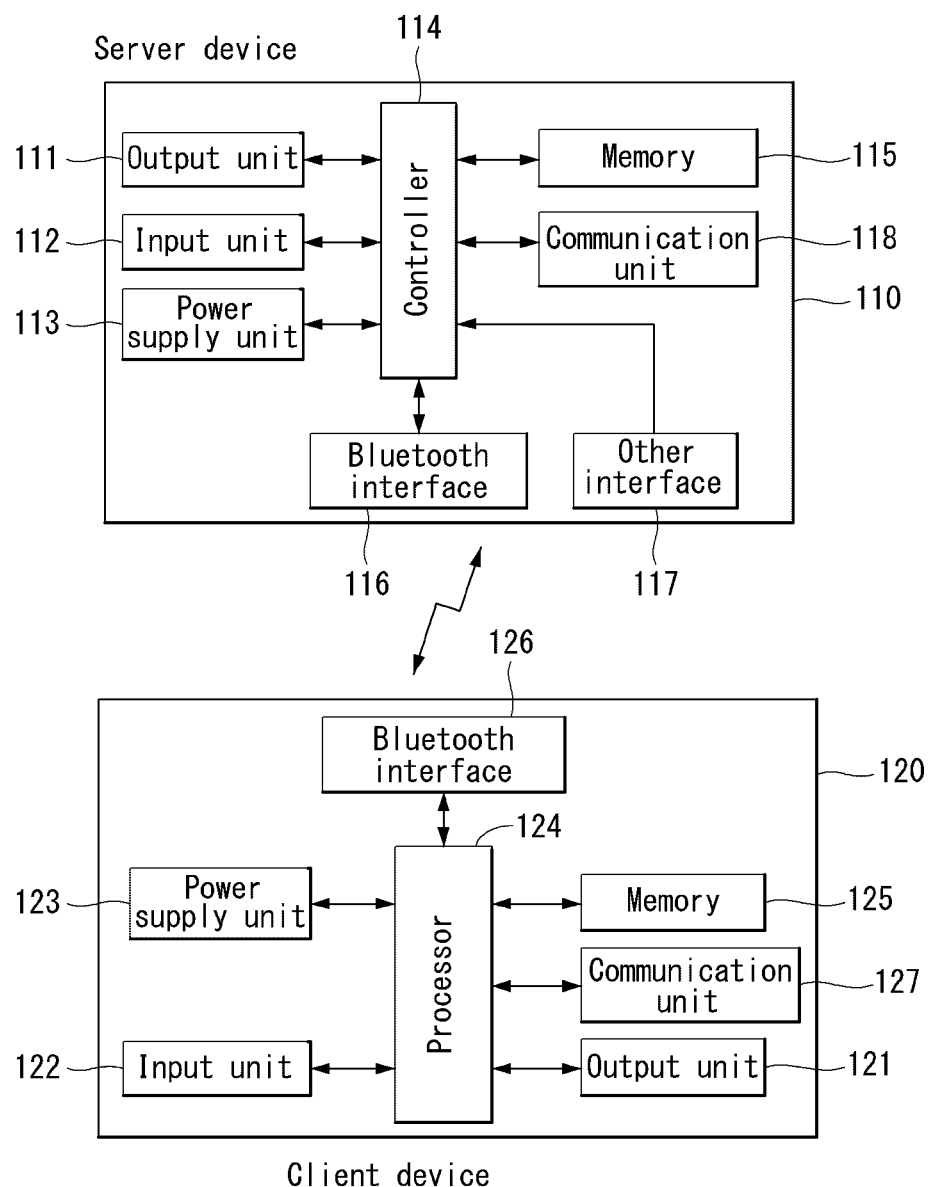
FIG. 2 illustrates one example of an internal block diagram of a server device and a client device capable of implementing methods of the present invention.

FIG. 2 illustrates one example of an internal block diagram of a server device and a client device capable of implementing methods of the present invention.

A server device can be connected to at least one client device.

Also, depending on the needs, the internal block diagram of each device may further include other constituting elements (modules, blocks, or units), and part of the constituting elements of FIG. 2 may be omitted.

As shown in FIG. 2, a server device comprises a display unit 111, a user input interface 112, a power supply unit 113, a processor (or controller) 114, a memory unit 115, a Bluetooth interface 116, other interface 117, and a communication unit (or transmitting and receiving unit) 118.

The display unit 111, user input interface 112, power supply unit 113, processor 114, memory unit 115, Bluetooth interface 116, other interface 117, and communication unit 118 are functionally connected to each other to perform a method of the present invention.

Also, a client device comprises a display unit 121, a user input interface 122, a power supply unit 123, a processor 124, a memory unit 125, a Bluetooth interface 126, and a communication unit (or transmitting and receiving unit) 127.

The display unit 121, user input interface 122, power supply unit 123, processor 124, memory unit 125, Bluetooth interface 126, and communication unit 127 are functionally connected to each other to perform a method of the present invention.

The Bluetooth interface 116, 126 refers to a unit (or module) capable of transmitting a request/response, command, notification, indication/confirm message, or data between devices by using Bluetooth technology.

The memory 115, 125 is a unit implemented in various types of devices and refers to a unit to which various types of data are stored.

The processor 114, 124 refers to a module controlling the overall operation of the server device or the client device; and controls the server device or the client device to request transmission of a message through the Bluetooth interface or other interface and to process a received message.

The processor 114, 124 can be represented by a controller or a control unit.

The processor 114, 124 can include

Application-Specific Integrated Circuit (ASIC), other chipsets, logical circuit and/or data processing device.

The memory 115, 125 can include ROM (Read-Only Memory), RAM (Random Access Memory), flash memory, memory card, storage medium and/or other storage device.

The communication unit 118, 127 can include baseband circuit for processing a radio signal. In case an embodiment is implemented in the form of software, the method described above can be implemented by a module (process or function) which performs the function described above. A module is stored in the memory and is carried out by the processor.

The memory 115, 125 can be installed inside or outside the processor 114, 124 and can be connected to the processor 114, 124 through various well-known means.

The display unit 111, 121 refers to the module for providing status information of a device and message exchange information to the user through a display.

The power supply unit 113, 123 refers to the module receiving external or internal power under the control of the controller and supplying power required for the operation of each individual element.

As described above, BLE technology is characterized by a small duty cycle and considerably reduces power consumption through a low data transmission rate; therefore, BLE technology is capable of supplying power required for the operation of each individual element even with small output power (which is less than 10 mW (10 dBm)).

The user input interface 112, 122 refers to the module which provides a user input such as a display button to the controller so that the user can control the operation of a device.

Figure 3:
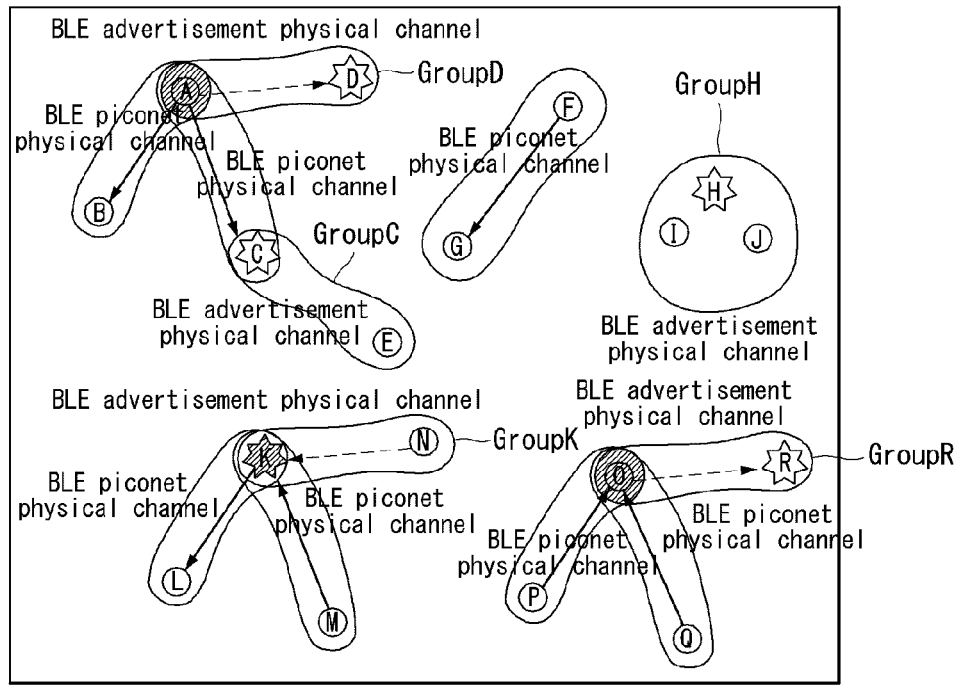
FIG. 3 illustrates one example of a Bluetooth low energy network topology.

FIG. 3 illustrates one example of a Bluetooth low energy network topology.

With reference to FIG. 3, a device A corresponds to a piconet (piconet A, the shaded area) master having a device B and a device C as slaves.

At this time, a piconet refers to a set of devices where one from among a plurality of devices acts as a master and the others occupy a shared physical channel connected to the master device.

A BLE slave does not share the common physical channel with the master. Each slave communicates with the master through a separate physical channel. There is another piconet (piconet F) which consists of a master device F and a slave device G.

A device K belongs to a scatternet K. At this time, a scatternet refers to a group of piconets interconnected to each other.

A device K is a master of a device L and at the same time, a slave of a device M.

A device O also belongs to a scatternet O. The device O is a slave of a device P and at the same time, a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In group D, the device D advertises by using an advertisement event which can be connected on an advertising physical channel, and the device A is an initiator. The device A can establish a connection to the device D and add a device to the piconet A.

In group C, the device C advertises on an advertising physical channel by using a certain type of an advertisement event captured by the scanner device E.

The group D and the group C can utilize different advertising physical channels or different time frames to avoid collision.

The piconet F has one physical channel. The device F and the device G use one BLE piconet physical channel. The device F is a master, and the device G is a slave.

The group H has one physical channel. The device H, I, and J use one BLE advertising physical channel. The device H is an advertiser, and the device I and J are scanners.

In the scatternet K, the device K and L use one BLE piconet physical channel. The device K and M use another BLE piconet physical channel.

In group K, the device K advertises by using an advertisement event which can be connected to an advertising physical channel, and the device N is an initiator. The device N can establish a connection with the device K. At this time, the device K acts as a slave of two devices, and at the same time, a master of one device.

In the scatternet O, the device O and P use one BLE piconet physical channel. The device O and Q use another BLE piconet physical channel.

In group R, the device R advertises by using an advertisement event which can be connected to an advertising physical channel, and the device O is an initiator. The device O can establish a connection with the device R. At this time, the device O acts as a slave of two devices, and at the same time, a master of one device.

Figure 4:
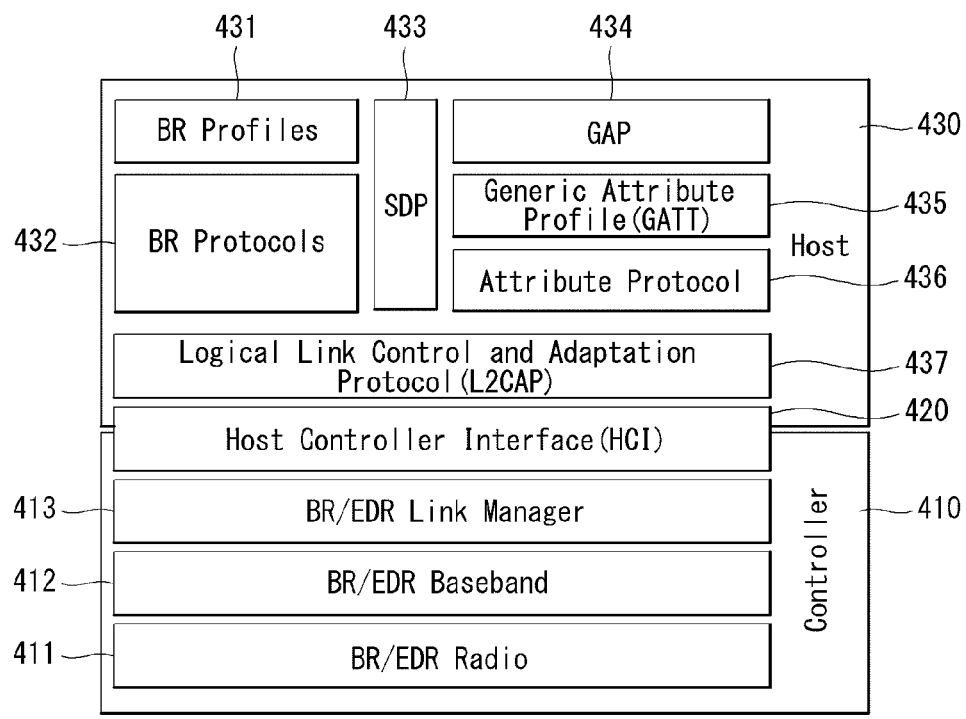
FIGS. 4 and 5 illustrate one example of Bluetooth communication architecture to which methods according to the present invention can be applied.
Figure 5:
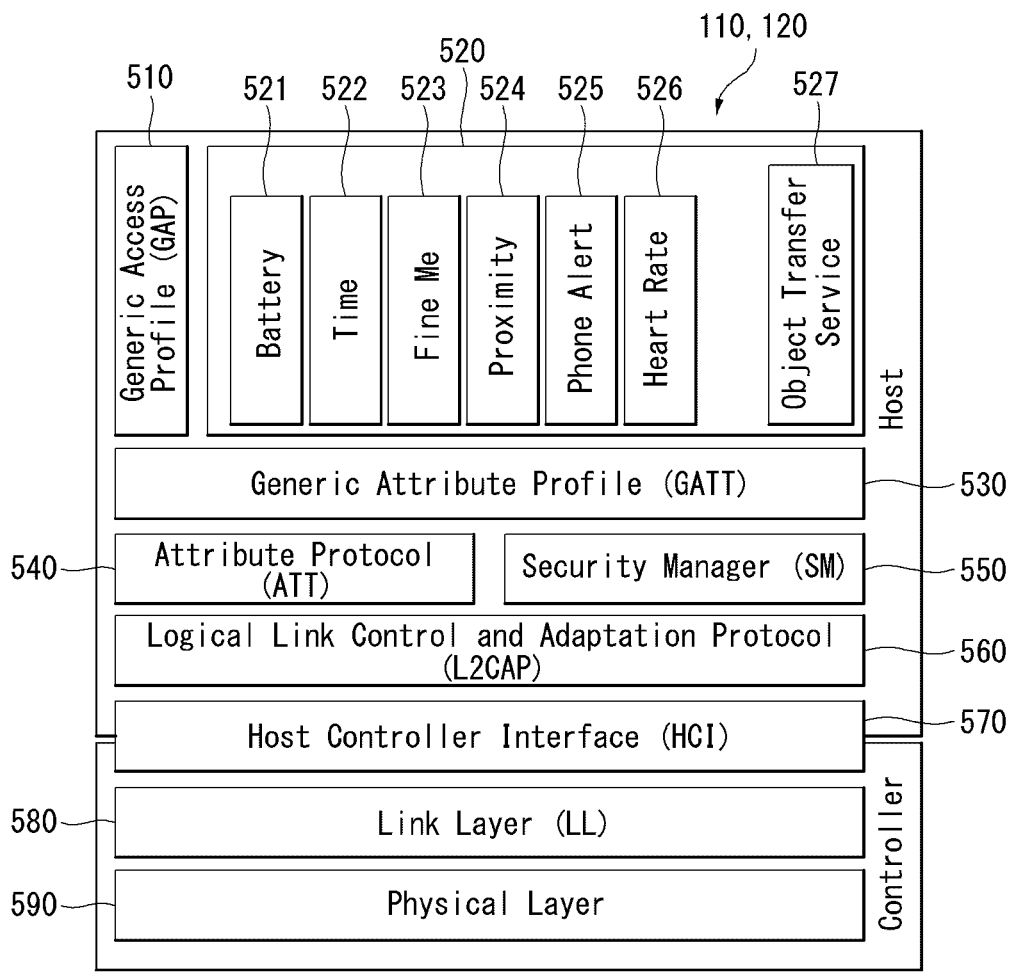

FIGS. 4 and 5 illustrate one example of Bluetooth communication architecture to which methods according to the present invention can be applied.

More specifically, FIG. 4 illustrates one example of Bluetooth BR (Basic Rate)/EDR (Enhanced Data Rate), and FIG. 5 illustrates one example of Bluetooth LE (Low Energy) architecture.

First, as shown in FIG. 4, Bluetooth BR/EDR architecture comprises a controller stack 410, HCI (Host Controller Interface) 420, and a host stack 430.

The controller stack (or controller module, 410) refers to the hardware for transmitting or receiving Bluetooth packets to and from a wireless transmission and reception module dealing with Bluetooth signals of 2.4 GHz; and comprises a BR/EDR Radio layer 411, BR/EDR Baseband layer 412, and BR/EDR Link Manager layer 413.

The BR/EDR Radio layer 411 transmits and receives a radio signal of 2.4 GHz and is capable of transmitting data by hopping 79 RF channels when Gaussian Frequency Shift Keying (GFSK) modulation is employed.

The BR/EDR baseband layer 412 transmits a digital signal, selects a channel sequence which performs hopping 1600 times per second, and transmits a time slot spanning 625 us for each channel.

The link manager layer 413 controls the overall operation of a Bluetooth connection such as link setup, control, and security by using Link Manager Protocol (LMP).

The link manager layer can perform the following functions.

Control of ACL/SCO logical transport and logical link setup

Detach: removes a connection and informs the corresponding device of the cause of the removal.

Performs power control and role switch

Performs a security function such as authentication, pairing, and encryption.

The host controller interface layer 420 provides an interface between a host module 430 and a controller module 410 so that a host can provide a command and data to a controller and the controller can provide an event and data to the host.

The host stack (or host module) 430 comprises L2CAP 437, Service Discovery Protocol (SDP) 433, BR/EDR protocol 432, BR/EDR profiles 431, Attribute Protocol 436, Generic Access Profile (GAP) 434, and Generic Attribute Profile (GATT) 435.

The Logical Link Control and Adaptation Protocol (L2CAP) 437 provides one bilateral channel for transmitting data according to a specific protocol or with a specific profile.

The L2CAP multiplexes various protocols and profiles provided by Bluetooth upper layers.

The L2CAP of the Bluetooth BR/EDR specification uses a dynamic channel; supports a protocol service multiplexer, retransmission, and streaming mode; and provides segmentation and reassembly, per-channel flow control, and error control.

The Service Discovery Protocol (SDP) 433 refers to the protocol used to search for a service (profile and protocol) that a Bluetooth service supports.

The BR/EDR protocols and profiles 432, 431 define a service employing the Bluetooth BR/EDR specification and an application protocol according to which exchange of data is performed.

The Attribute Protocol 436 relies on a server-client structure, which defines rules for the corresponding device to access data. Six message types are defined as shown below: Request message, Response message, Command message, Notification message, and Indication message.

Request message from client to server with Response message from server to client Command message from client to server without Response message Notification message from server to client without Confirm message Indication message from server to client with Confirm message from client to server The Generic Attribute Profile (GATT) 435 defines an attribute type.

The Generic Access Profile (GAP), 434 defines a method for discovering and connecting a device; and a method for providing information to a user. The GAP provides a privacy scheme.

As shown in FIG. 5, the BLE structure comprises a controller stack capable of processing a wireless device interface for which timing is critical and a host stack capable of processing high level data.

The controller stack may be called a controller, but in order to avoid being confused with the processor which is an internal element of a device described earlier in FIG. 2, the name of the controller stack is preferred in what follows.

First, the controller stack can be implemented by using a communication module which can include a Bluetooth wireless device and a processor module which can include a processing device such as a microprocessor.

The host stack can be implemented as part of the OS operating on the processor module or as a package instance on the OS.

In some cases, the controller stack and the host stack can be operated or carried out on the same processing device within the processor module.

The host stack comprises Generic Access Profile (GAP) 510, GATT based Profiles 520, Generic Attribute Profile (GATT) 530, Attribute Protocol (ATT) 540, Security Manager (SM) 550, and Logical Link Control and Adaptation Protocol (L2CAP) 560. The host stack is not limited to the aforementioned composition, but can include various protocols and profiles.

By using the L2CAP, the host stack multiplexes various protocols and profiles that Bluetooth specification provides.

First, the L2CAP 560 provides one bilateral channel for transmitting data to according to a specific protocol or with a specific profile.

The L2CAP is capable of multiplexing data among upper layer protocols, segmenting or reassembling packages, and managing multicast data transmission.

BLE uses three fixed channels: one for signaling, another for the security manager, and the third for the attribute protocol.

On the other hand, BR/EDR (Basic Rate/Enhanced Data Rate) uses a dynamic channel and supports protocol service multiplexer, retransmission, streaming mode.

The Security Manager (SM) 550 authenticates a device, which is a protocol for providing key distribution.

The Attribute Protocol (ATT) 540 relies on a server-client structure, which defines rules for the corresponding device to access data. Six message types are defined: Request, Response, Command, Notification, Indication, and Confirmation.

Request and Response message: Request message is used when a client device requests specific information from a server device, and Response message is used in response to the Request message, which is transmitted from the server device to the client device.

Command message: It is transmitted from the client device to the server device to indicate a command for specific operation, but the server device does not transmit a response to the Command message to the client device.

Notification message: The server device transmits this message to the client device to notify of an event, but the client device does not transmit a confirmation message with respect to the Notification message to the server.

Indication and Confirm message: the server device transmits this message to the client device to notify of an event. Different from the Notification message, the client device transmits a Confirm message with respect to the Indication message to the server device.

The Generic Access Profile (GAP) is the layer newly implemented to support BLE technology and is used to control selection of roles for communication among BLE devices and the procedure of multi-profile operation.

The GAP is used mainly for device discovery, connection establishment, and security; defines a method for providing information to a user; and defines the following attribute types.

Service: a combination of behaviors related to data. Defines basic operation of a device.

Include: defines a relationship between services.

Characteristics: a data value used by a service

Behavior: a format that can be readable by a computer, which is defined by Universal Unique Identifier (UUID) and a value type.

GATT-based profiles are dependent on the GATT and are applied mainly for BLE devices. The GATT-based profiles may include Battery, Time, FindMe, Proximity, Object Delivery Service, and so on. More specific descriptions of the GATT-based profiles are as follows.

Battery: method for exchanging battery information.

Time: method for exchanging time information.

FindMe: provides an alarm service according to a distance.

Proximity: method for exchanging battery information.

The GATT can be used as a protocol by which to describe how ATT is utilized at the time of composing services. For example, the GATT can be used to define how ATT profiles are grouped together with services and to describe characteristics associated with the services.

Therefore, GATT and ATT describe device states and services; and how features are associated with each other and how they are used.

The controller stack comprises a physical layer 590, link layer 580, and host controller interface 570.

The physical layer (wireless transmission and reception module 590) transmits and receives a radio signal of 2.4 GHz; and uses Gaussian Frequency Shift Keying (GFSK) modulation and frequency hopping utilizing 40 RF channels.

The link layer 580 transmits or receives Bluetooth packets.

Also, the link layer establishes a connection between devices after performing the advertising and scanning function by using three advertising channels; and provides a function of exchanging a maximum of 42 bytes of data packets through 37 data channels.

The Host Controller Interface (HCI) provides an interface between the host stack and the controller stack so that the host stack can provides commands and data to the controller stack and the controller stack can provide events and data to the host stack.

In what follows, the procedure of Bluetooth Low Energy (BLE) will be described briefly.

The BLE procedure comprises a device filtering procedure, advertising procedure, scanning procedure, discovering procedure, and connecting procedure.

Device Filtering Procedure

The device filtering procedure is intended to reduce the number of devices performing a response to a request, command, or notification in the controller stack.

It is not necessarily required for all of the devices to respond to a received request; therefore, the controller stack reduces the number of transmitted requests so that power consumption can be reduced in the BLE controller stack.

An advertising device or a scanning device can perform the device filtering procedure to restrict devices which receive advertisement packets, scan request, or connection request.

At this time, an advertising device refers to a device which transmits an advertisement event, namely a device which performs advertisement and is also called an advertiser.

A scanning device refers to a device which performs scanning, namely a device which transmits a scan request.

In the BLE specification, if a scanning device receives part of advertisement packets from an advertising device, the scanning device has to transmit a scan request to the advertising device.

However, in case transmission of a scan request is not required as the device filtering procedure is employed, the scanning device can ignore advertisement packets transmitted from an advertising device.

The device filtering procedure can be used even in the connection request procedure. If device filtering is used for the connection request procedure, the need for transmitting a response to a connection request can be made unnecessary by ignoring the connection request.

Advertising Procedure

An advertising device performs an advertisement procedure to perform non-directional broadcast by using the devices within the range of the advertising device.

At this time, non-directional broadcast refers to the broadcast in all directions rather than the broadcast in specific directions.

Different from the non-directional broadcast, directional broadcast refers to the broadcast in a specific direction. Non-directional broadcast is performed without involving a connection procedure between devices in a listening state (in what follows, they are called listening delves).

The advertising procedure is used to establish a Bluetooth connection to a nearby initiating device.

Or the advertising procedure can be used to provide periodic broadcast of user data to the scanning devices performing listening through an advertising channel.

In the advertising procedure, all of the advertisement (or advertisement events) are broadcast through an advertising physical channel.

Advertising devices can receive scan requests from listening devices performing the listening operation to obtain additional user data from advertising devices. An advertising device transmits a response with respect to the scan request to the device which has transmitted the scan request through the same advertising physical channel through which the advertising device has received the scan request.

While the broadcast user data sent as part of advertising packets form dynamic data, the scan response data are static for the most part.

An advertising device can receive a connection request from an initiating device on the advertising (broadcast) physical channel. If the advertising device has used a connectable advertisement event and the initiating device has not been filtered by the filtering procedure, the advertising device stops advertisement and enters a connected mode. The advertising device can resume advertisement after entering the connected mode.

Scanning Procedure

A device performing scan operation, namely a scanning device performs a scanning procedure to listen to non-directional broadcast of user data from advertising devices which use an advertising physical channel.

To request additional user data, the scanning device transmits a scan request to an advertising device through the advertising physical channel. The advertising device transmits a scan response with respect to the scan request through the advertising physical channel by including additional user data that the scanning device has requested.

The scanning procedure can be used while the scanning device is being connected to another BLE device in a BLE piconet.

If the scanning device receives a broadcast advertising event and stays in an initiator mode where a connection request can be initiated, the scanning device can initiate a Bluetooth connection to an advertising device by sending a connection request to the advertising device through the advertising physical channel.

If the scanning device transmits a connection request to the advertising device, the scanning device stops all the scanning for additional broadcast and enters the connected mode.

Discovering Procedure

Devices capable of Bluetooth communication (in what follows, they are called 'Bluetooth devices') perform the advertising procedure and the scanning procedure to discover devices in the surroundings of the devices or to be discovered by other devices within a given area.

The discovering procedure is performed in an asymmetric manner. A Bluetooth device searching for another Bluetooth device in the surroundings is called a discovering device and performs listening to search for devices advertising an advertisement event that can be scanned. A Bluetooth device that can be found and used by another device is called a discoverable device, and the discoverable device actively broadcasts an advertisement event so that other devices can scan the discoverable device through an advertising (broadcast) physical channel.

Both of the discovering device and the discoverable device may be already connected to other Bluetooth devices in a piconet.

Connecting Procedure

The connecting procedure is asymmetric. In the connecting procedure, while a particular Bluetooth device is performing the advertising procedure, other Bluetooth devices are required to perform the scanning procedure.

In other words, the advertising procedure can be a primary task to be performed, and as a result, only one device will respond to the advertisement. After receiving a connectable advertisement event from an advertising device, the connecting procedure can be initiated by sending a connection request to the advertising device through the advertising (broadcast) physical channel.

Next, operation states defined in the BLE technology, namely advertising state, scanning state, initiating state, and connection state will be described briefly.

Advertising State

The link layer (LL) enters the advertising state by the command of the host (stack). In case the link layer is in the advertising state, the link layer transmits advertising Packet Data Units (PDUs) from advertisement events.

Each advertisement event comprises at least one advertising PDU, and advertising PDUs are transmitted through advertising channel indices used. Each advertisement event can be closed earlier in case advertising PDUs are transmitted through the respective advertising channel indices, the advertising PDUs are terminated, or the advertising device needs to secure space to perform other functions.

Scanning State

The link layer enters the scanning state by the command of the host (stack). In the scanning state, the link layer listens to advertising channel indices.

The scanning state supports two types: passive and active scanning. The host determines scanning type.

No separate time or advertising channel index is defined to perform scanning.

While in the scanning state, the link layer listens to the advertising channel index for the duration of scanWindow. A scanInterval is defined as an interval between start points of two consecutive scan windows.

When there is no scheduling collision, the link layer has to perform listening to complete all of the scanIntervals of scanWindows as commanded by the host. In each scanWindow, the link layer has to scan other advertising channel indices. The link layer uses all of the advertising channel indices available.

In the case of passive scanning, the link layer is unable to transmit any packet but only receives packets.

In the case of active scanning, the link layer performs listening to the advertising device to rely on the advertising PDU type by which additional information related to the advertising PDUs and advertising device can be requested.

Initiating State

The link layer enters the initiating state by the command of the host (stack).

While in the initiating state, the link layer performs listening to the advertising channel indices.

While in the initiating state, the link layer listens to the advertising channel index for the duration of scanWindow.

Connection State

The link layer enters the connection state when a device performing a connection request, namely the initiating device transmits the CONNECT_REQ PDU to an advertising device or the advertising device receives the CONNECT_REQ PDU from the initiating device.

Establishing a connection is taken into account after the link layer enters the connection state. However, there is no need to take into account establishing a connection at the time the link layer enters the connection state. The only difference between a newly created connection and a pre-existing connection is a supervision timeout value for link layer connection.

When two devices are connected to each other, the two devices perform the respective roles different from each other.

The link layer performing the role of the master is called a master, while the link layer performing the role of the slave is called a slave. The master adjusts the timing of a connection event, where the connection event denotes the time at which the mast and the slave are synchronized with each other.

A master (central) is such a device that periodically scans a connectable advertising signal to establish a connection to other device (slave, peripheral) and requests an appropriate device to establish a connection.

Also, once connected to a slave device, the master device sets up timing and supervises periodic data exchange.

At this time, the timing can be a hopping rule applied to two device to exchange data each time through the same channel.

A slave (peripheral) is such a device that periodically transmits a connectable advertising signal to establish a connection with other device (master).

Therefore, if a master device which has received the connectable advertising signal sends a connection request, the slave device accepts the request and establishes a connection with the master device.

After the slave device establishes a connection with the master device, the slave device exchanges data periodically by hopping a channel according to the timing specified by the master device.

In what follows, the packet defined in the Bluetooth interface will be described briefly. BLE devices use the packets described below.

Packet Format

The link layer has only one packet format used for both of the advertising channel packet and data channel packet.

Each packet comprises four fields: a preamble, access address, PDU, and CRC.

When one packet is transmitted from the advertising physical channel, the PDU will function as an advertising channel PDU; when one packet is transmitted from the data physical channel, the PDU will function as a data channel PDU.

Advertising Channel PDU

The advertising channel PDU comprises a 16 bit header and a payload of various size.

The PDU type filed of the advertising channel included in the header supports PDU types as defined in Table 1 below.

TABLE 1

| PDU Type | PACKet Name |
| --- | --- |
| 0000 | ADV-IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: connectable non-directional advertisement event

ADV_DIREC_IND: connectable directional advertisement event

ADV_NONCONN_IND: non-connectable non-directional advertisement event

ADV_SCAN_IND: non-directional advertisement event that can be scanned

The PDUs are transmitted from the link layer in the advertising state and are received by the link layer in the scanning state or initiating state.

Scanning PDUs

The advertising channel PDU type below is called a scanning PDU and is used in such a state described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU comprises a 16 bit header and a payload of various size; and can include a Message Integrity Check (MIC) field.

The procedures, states, and packet formats of the BLE technology descried above can be applied to perform the methods according to the present invention.

In what follows, the connection procedure defined in the BLE technology will be described briefly and as one example of the connection procedure, a method for providing an object transmission service according to the BLE specification will be described.

Figure 6:
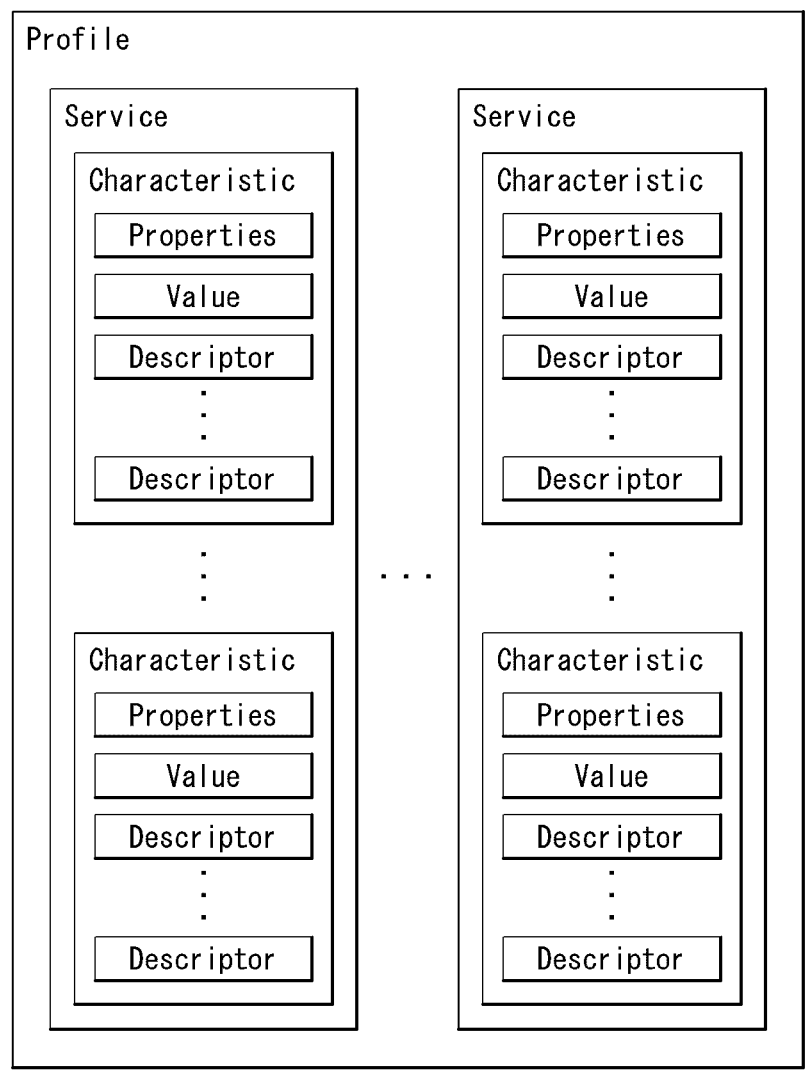
FIG. 6 illustrates one example of a GATT Profile structure of the Bluetooth low energy specification.

FIG. 6 illustrates one example of a GATT Profile structure of the Bluetooth low energy specification.

With reference to FIG. 6, one can see the structure for exchanging profile data defined in the Bluetooth low energy specification.

More specifically, GATT (Generic Attribute Profile) defines a method for exchanging data by using a service between Bluetooth LE devices and characteristics thereof.

In general, a peripheral device (for example, a sensor device) performs the role of a GATT server and carries a definition for the service and characteristics.

To read or write data, a GATT client sends a data request to the GATT server; the GATT client initiates all of the transactions and receives a response from the GATT server.

The GATT-based operational structure defined in the Bluetooth LE is based on profiles, services, and characteristics, which form a hierarchical structure as shown in FIG. 6.

The profile can consist of one or more services, and the service can consist of one or more characteristics or other services.

The service groups data into logical units and includes one or more characteristics or other services.

Each service has an identifier of 16 bits or 128 bits, called a Universal Unique Identifier (UUID).

The characteristic forms the lowest unit in the GATT-based operational structure. The characteristic contain only one piece of data and similarly to the service, has a UUID of 16 bits or 128 bits.

The characteristic includes descriptors for various types of information and requires one attribute to describe each individual information. The characteristic can use a couple of consecutive attributes.

The attribute comprises four constituting elements as follows.

handle: address of the attribute
Type: type of the attribute
Value: value of the attribute
Permission: access right to the attribute In what follows, a connection procedure in the Bluetooth LE will be described, and as one example thereof, a method for providing an object transfer service according to the Bluetooth LE will be described.

Figure 7:
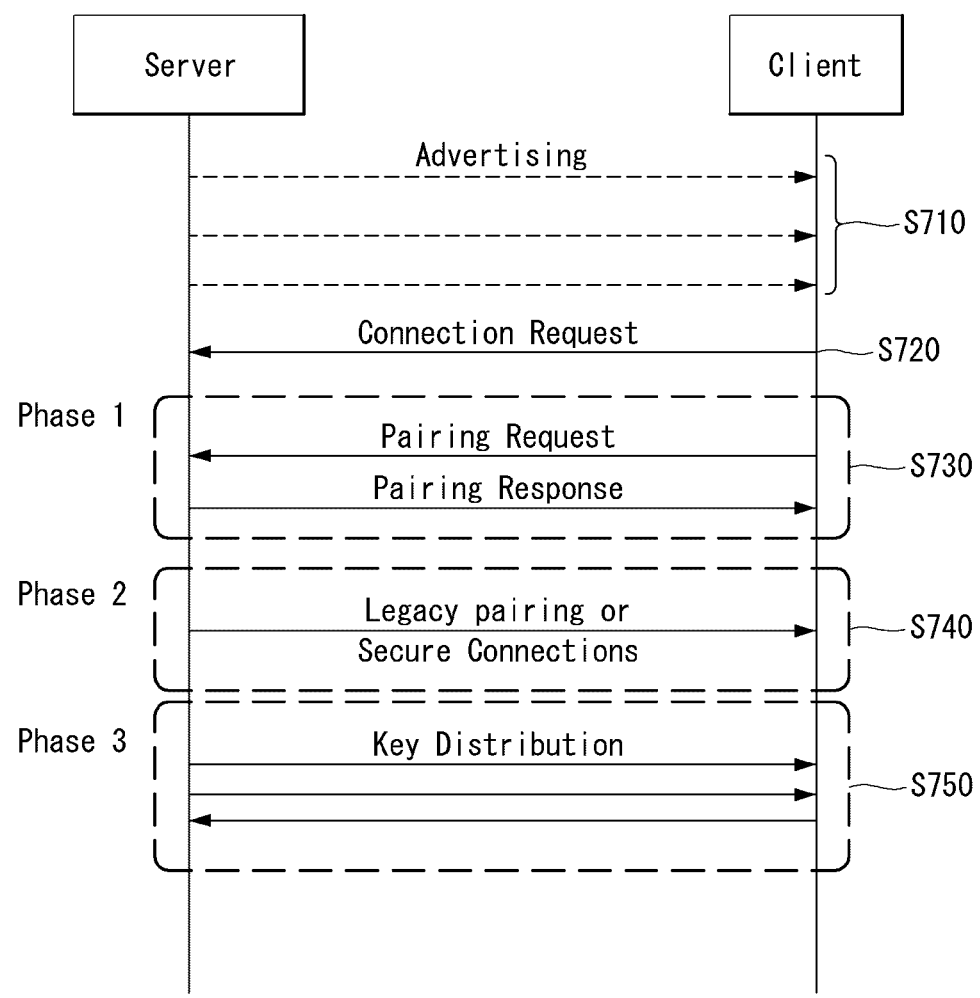
FIG. 7 illustrates one example of a method for connection procedure of the Bluetooth low energy specification.

FIG. 7 illustrates one example of a method for connection procedure of the Bluetooth low energy specification.

A server transmits an advertisement message through three advertisement channels S710.

The server can be called an advertiser before connection is established and can be called a master after connection is established. Examples of the server include sensors (for example, temperature sensors).

Also, the client can be called a scanner before connection is established and can be called a slave after connection is established. An example of the client is a smartphone.

As described above, Bluetooth communication employs a total of 40 channels through the frequency of 2.4 GHz. Of the 40 channels, 3 channels are advertisement channels, used for exchanging packets to establish a connection as well as various advertising packets.

The remaining 37 channels are data channels, used for exchange of data packets after connection is established.

After receiving the advertisement message, the client can transmit a scan request to the server to obtain additional data (for example, a server device name) from the server.

Then the server transmits a scan response along with the remaining data to the client in response to the scan request.

At this time, the scan request and the scan response are one type of an advertisement packet which can include only user data of 31 bytes or less.

Therefore, in case data size is larger than 31 bytes but with large overhead from established connection to send data, the data are divided into two blocks and transmitted twice by using the scan request/scan response.

Next, the client transmits to the server a connection request for establishing a Bluetooth connection with the server S720.

Through the aforementioned step, a link layer (LL) connection is established between the server and the client.

Afterwards, the server and the client perform a security establishment procedure.

The security establishment procedure can be interpreted as secure simple pairing or can be performed with the secure simple pairing being included therein.

In other words, the security establishment procedure can be performed through phase 1 to phase 3.

More specifically, a pairing procedure (phase 1) is carried out between a server and a client S730.

Through the pairing procedure, the client transmits a pairing request to the server, and the server transmits a pairing response to the client.

Next, in the phase 2, legacy pairing or secure connection is carried out between the server and the client S740.

Next, in the SSP phase 3, a key distribution procedure is carried out between the server and the client S750.

Through the phases, a secure connection is established between the server and the client, and encrypted data can be transmitted and received.

Figure 8:
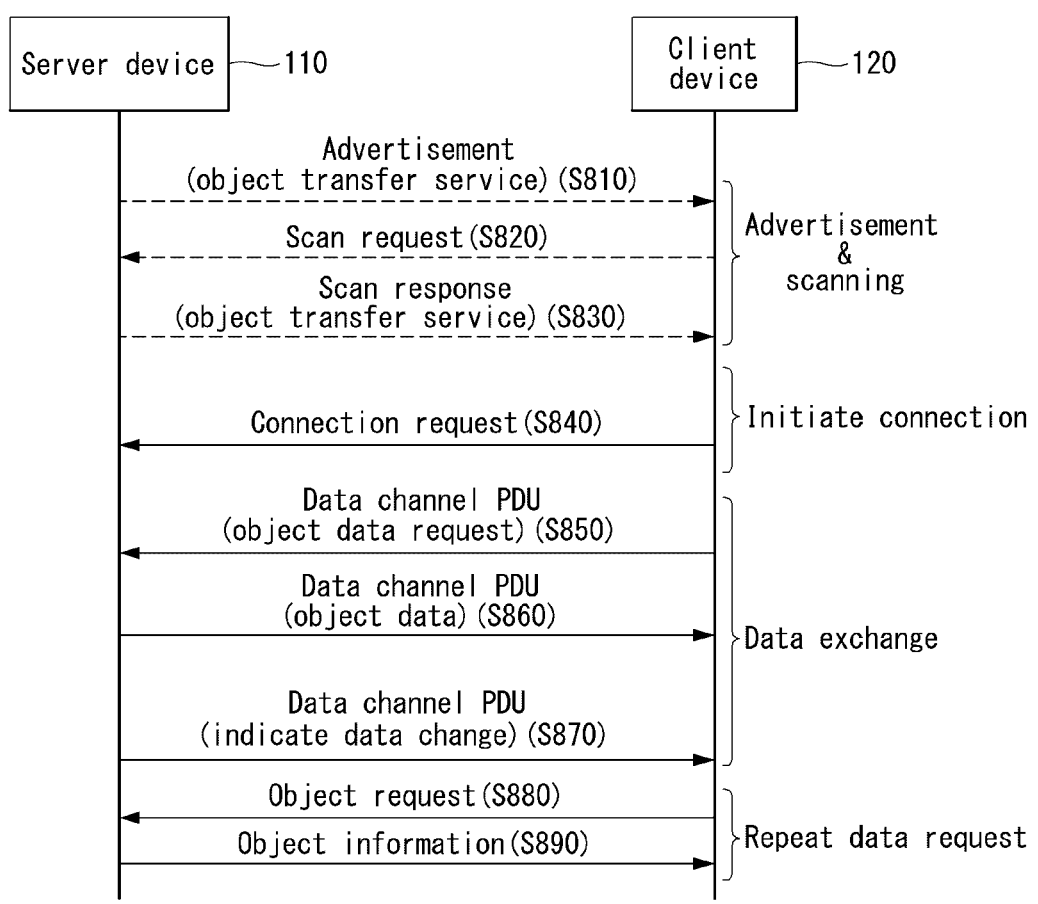
FIG. 8 is a flow diagram illustrating one example of a method for providing an object transfer service according to the Bluetooth low energy technology.

FIG. 8 is a flow diagram illustrating one example of a method for providing an object transfer service according to the Bluetooth low energy technology.

An object delivery service or object transfer service refers to a service supported by the BLE to transmit/receive an object such as bulk data or data in the Bluetooth communication.

To establish a Bluetooth connection between a server device and a client device, an advertisement process and a scanning process corresponding to S810 to S830 steps are carried out.

First, the server device transmits an advertisement message to the client device to inform of the information related to the server device including an object transfer service S810.

The advertisement message can be expressed as an advertisement packet data unit (PDU), advertisement packet, advertisement, advertisement frame, or advertisement physical channel PDU.

The advertisement message can include service information (including a service name) provided by the server device, name of the server device, and manufacturer data.

Also, the advertisement message can be transmitted to the client device according to the broadcast or unicast scheme.

Afterwards, the client device transmit a scan request message to the server device to figure out detailed information related to the server device S820.

The scan request message can be expressed as a scanning PDU, scan request PDU, scan request, scan request frame, or scan request packet.

Afterwards, the server device transmits a scan response message to the client device in response to the scan request message received from the client device S830.

The scan response message includes server device-related information requested by the client device. At this time the server device-related information may be an object or data that can be transmitted from the server device in association with provision of the object transfer service.

In case the advertisement process and the scanning process are terminated, the server device and the client device perform an initiating connection process and data exchange process corresponding to S840 to S870 steps.

More specifically, the client device transmits a connection request message to the server device to establish a Bluetooth communication connection with the server device S840.

The connection request message can be expressed as a connection request PDU, initiation PDU, connection request frame, or connection request.

Through the S840 step, a Bluetooth connection is established between the server device and the client device, after which the server device and the client device exchange data with each other. During the data exchange process, data can be transmitted and received through the data channel PDU.

The client device transmits an object data request to the server device through the data channel PDU S850. The data channel PDU can be expressed as a data request message or data request frame.

Afterwards, the server device transmits object data requested by the client device to the client device through the data channel PDU S860.

At this time, the data channel PDU is used for providing data to a corresponding device or requesting data information according to the scheme defined in the attribute protocol.

Next, in case data change occurs in the server device, the server device transmits data changed indication information to the client device through the data channel PDU to notify of change of data or object S870.

Next, the client device requests changed object information from the server device to search for changed data or changed object S880.

Next, the server device transmits changed object information to the client device in response to the request for changed object information S890.

Next, the client device searches for a changed object through a comparative analysis of the received changed object information and the object information that the client device currently has.

However, the client device performs S880 and S890 step repeatedly until a changed object or data are found.

Next, in case it is not required to maintain a connected state between the host device and the client device any more, the host device or the client device can disconnect the corresponding connected state.

Figure 9:
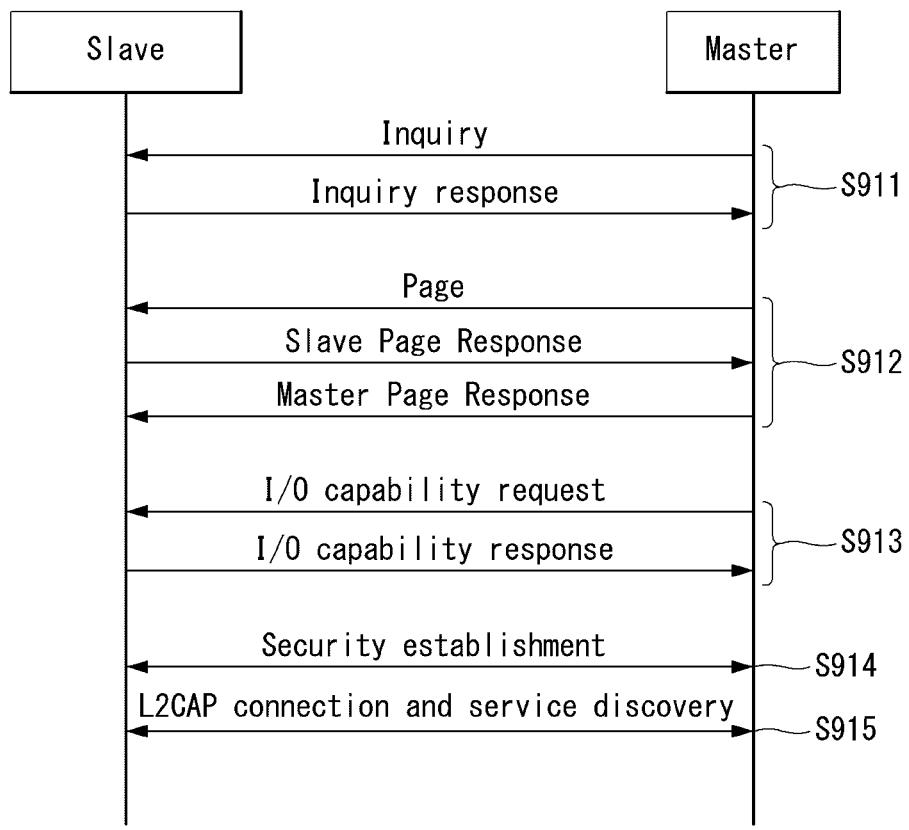
FIG. 9 is a flow diagram illustrating one example of a method for connection procedure according to the Bluetooth BR/EDR technology.

FIG. 9 is a flow diagram illustrating one example of a method for connection procedure according to the Bluetooth BR/EDR technology.

As shown in FIG. 9, the connection procedure defined in the Bluetooth BR/EDR consists of the following steps.

The connection procedure may be referred to as a pairing procedure.

The Bluetooth pairing procedure is described only by a standby state and a connected state.

The device which has completed Bluetooth pairing enters the connected state, and the device which has ended a connection operates in the standby state.

Also, Bluetooth devices, once connected to a specific device through the connection procedure, can perform a re-connection procedure to establish re-connection afterwards.

The re-connection procedure can be performed through the same procedure as the connection procedure.

More specifically, if power is applied, a master device enters the standby state by default.

Afterwards, the master device performs an inquiry procedure S911 to discover neighboring devices for Bluetooth connection.

In other words, the master device can enter an inquiry state to discover connectable devices (slaves) in the surroundings thereof, and a slave device can enter an inquiry scan state to receive an ID packet transmitted from a neighboring device (master) in the inquiry state.

The master device in the inquiry state transmits an inquiry message by using the ID packet once or at regular intervals to discover a connectable device in the neighborhood.

The ID packet can be a general inquiry access code (GIAC) or a dedicated inquiry access code (DIAC).

After receiving GIAC or DIAC, an ID packet that the master device has transmitted, the slave device transmits a frequency hopping sequence (FHS) to perform Bluetooth pairing with the master device.

Also, depending on the needs, if there are data to transmit, the slave device can transmit an extended inquiry response (hereinafter, it is called EIR) to the master device.

If a connectable Bluetooth device is found in the neighborhood through the inquiry procedure, a paging procedure S912 is carried out.

The paging procedure S912 refers to the procedure of performing actual connection by synchronizing a hopping sequence by using an address, clock information, and so on if a connectable Bluetooth device is found in the neighborhood through the inquiry procedure.

More specifically, the paging procedure can be divided into the following steps: (1) a step wherein the master device transmits a page to the slave device, (2) a step wherein the slave device transmits a slave page response to the master device, and (3) a step wherein the master device transmits a master page response to the slave device.

If the inquiry procedure and the paging procedure are completed, the master device and the slave device perform a security establishment step S914 and then L2CAP connection and service discovery step S915.

Before performing the security establishment step, the master device and the slave device exchange I/O (Input/Output) capabilities with each other S913.

The S913 step can be performed through an I/O capability request and I/O capability response.

Also, the security establishment step can be interpreted as secure simple pairing or can be performed with the secure simple pairing being included therein.

The L2CAP (Logical Link Control and Adaptation Protocol) is a packet-based protocol, exhibiting characteristics similar to the UDP protocol. The L2CAP supports a packet size of 672 bytes and is capable of supporting up to 65,535 bytes once communication is initiated.

After performing the L2CAP connection and service discovery step, the master device can transmit data received from the user to the slave device S916.

If no further data exchange is performed for a predetermined time period between the master and the slave device which have performed the connection procedure as described above, the master and the slave devices enters a sleep state to prevent energy consumption, and the connected state is terminated.

Afterwards, a re-connection procedure is performed so that the master device and the slave device can transmit/receive data again.

The re-connection procedure can be performed through the same procedure as the one described earlier.

Overview of Isochronous Channel

Figure 10:
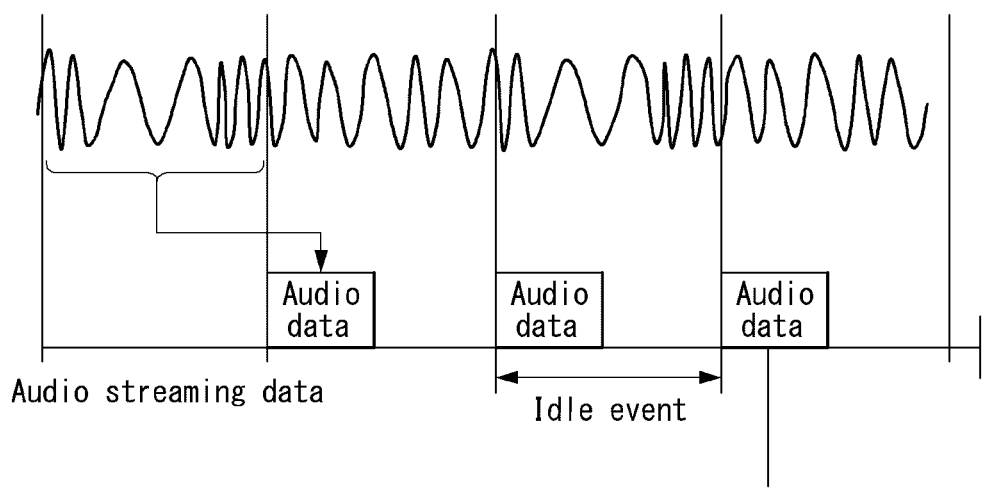
FIG. 10 illustrates characteristics of an audio signal.

FIG. 10 illustrates characteristics of an audio signal.

As shown in FIG. 10, in the case of an audio signal, audio streaming data or audio data are generated periodically at idle event intervals.

Audio data are generated periodically (or at specific time intervals) according to the characteristics thereof.

At this time, the specific time interval at which audio data are generated periodically can be expressed as an idle event interval.

Audio data are transmitted at individual idle event intervals.

Also, individual audio data can be transmitted throughout the whole or part of the idle event interval.

As shown in FIG. 10, in case audio streaming data generated periodically or regularly are transmitted according to the BLE mechanism, an advertisement and scanning procedure, communication procedure, disconnection procedure, and so on have to be performed each time the generated audio data are transmitted or received.

However, as shown in FIG. 10, since audio data are generated at regular intervals for most cases, latency guarantee with respect to transmission of the audio data is essential irrespective of the amount of audio data.

However, if the advertisement and scanning procedure, communication procedure, disconnection procedure, and so on are performed each time newly generated audio data are transmitted, a latency problem arises during transmission of audio data.

Since audio data transmission through an HA or headset deals with a relatively small amount of generated data, high energy efficiency can be achieved if the BLE technology rather than the Bluetooth BE/EDR technology is employed. As described earlier, however, since the data channel process of the BLE technology has to perform advertising, connection, and the like for each data transmission, large overhead is generated and what is more, latency guarantee absolutely required for transmission of audio data cannot be achieved.

Also, the data channel process of the BLE technology is intended to transmit intermittently generated data only when necessary, thereby improving energy efficiency by leading a BLE device in a different time region to deep sleep. Therefore, it may be difficult to apply the data channel process of the BLE technology to the transmission of audio data generated at regular intervals.

Due to these reasons, it is necessary to define a new mechanism by which to transmit and receive periodically generated data such as audio streams by using the BLE technology.

In what follows, described in detail will be method for transmitting and receiving data generated at regular intervals (for example, audio data) by using the BLE technology.

In other words, provided will be a method for transmitting data generated at regular intervals by newly defining a channel for transmitting and receiving (or transceiving) data generated at regular intervals in the BLE technology and additionally defining a mechanism related to handling regular data as long as energy performance of the BLE is not affected.

The terms such as audio streaming data, audio data, audio streaming, and audio stream used in this document can be interpreted to provide the same meaning.

In what follows, for the convenience of understanding, the term of audio data will be used to represent the different terms.

Isochronous Channel and Definition of a Mechanism Related to the Isochronous Channel A new channel, namely isochronous channel is defined to transmit data generated at regular intervals by using the BLE technology.

An isochronous channel is used for transmitting isochronous data to the devices using isochronous streams.

Isochronous data refer to the data transmitted at particular time intervals, namely periodically or regularly.

In other words, an isochronous channel can represent a channel which transmits and receives data generated periodically, such as audio data in the BLE technology.

The isochronous channel can be used to transmit and receive audio data to and from a single member, three of one or more coordinated members, or a plurality of members.

Also, the isochronous channel corresponds to an isochronous stream such as an audio stream or a flushing channel that can be used for transmitting and receiving important data in other time regions.

The methods for using an isochronous channel described later are used independently of the advertising channel and data channel defined in the existing (v4.2 or earlier) BLE technology.

Also, this document additionally defines a new frequency channel and frequency hopping interval for an isochronous channel.

The isochronous channel enables a conductor to transmit an isochronous stream such as flushable data (for example, time-bound audio data) to one or more members by using the BLE.

At this time, the conductor may be expressed as a master, and the member may be expressed as a slave.

Also, the isochronous channel may or may not be configured by security setting.

Also, the isochronous channel can be set up for various topologies to allow transmission of an isochronous stream between a single conductor and a member, between a single conductor and a coordinated pair of members generating a stereo audio stream, such as hearing aids or stereo headsets, and between a single conductor and a plurality of members synchronized with the same isochronous stream(s).

At this time, a member can transmit data to the conductor through an isochronous channel.

Also, the isochronous channel may support transmission and reception of shared audio, public audio, and broadcast audio as well as transmission and reception of personal audio.

A setup procedure of an isochronous channel requires that hierarchy of profile level security and reliability requirements satisfy the respective use cases.

Also, an isochronous channel can be used for various applications, by which a plurality of audio sources and sinks can be set up, and complicated topologies may be set up to allow users to regularly change or share different audio streams.

Figure 11:
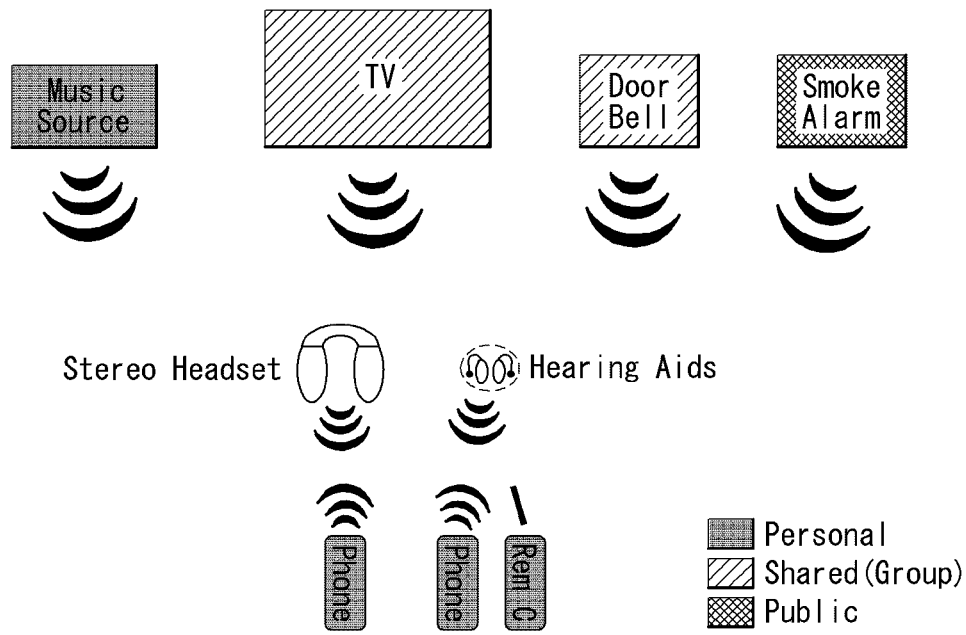
FIG. 11 illustrates one example of a hone ecosystem for applications to which an isochronous channel can be applied.

FIG. 11 illustrates one example of a hone ecosystem for applications to which an isochronous channel can be applied.

In other words, FIG. 11 illustrates one example of space wherein a plurality of audio conductors and members to which methods according to the present invention can be applied can move around inside/outside individual domains.

As shown in FIG. 11, existence of various conductors and members indicate that an isochronous channel is required as a method for notifying of existence of members so that the members can obtain information required for configuring the isochronous channel.

An isochronous channel may also be used for transmission and reception of non-audio data.

A member may use isochronous channels to determine existence of notification messages which can include acquisition information from conductors within the range of BLE communication.

Also, the member may use isochronous channels to receive a request with respect to control information or service data from one or more devices acting like a remote controller.

Figure 12:
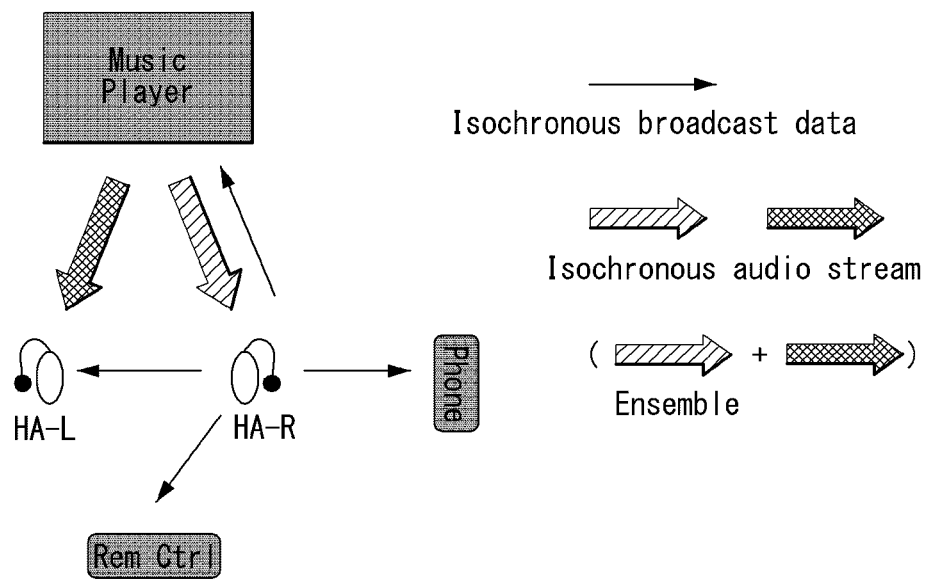
FIG. 12 illustrates an example of using an isochronous channel.

FIG. 12 illustrates an example of using an isochronous channel.

In other words, FIG. 12 illustrates an example where a pair of HAs are connected to a plurality of conductors and remote control devices through an isochronous channel.

As shown in FIG. 12, the right HA (HA-R) acts as a conductor broadcasting data through an isochronous channel.

Also, the HA-R can transmit a control request to all of the devices once connected to the HA-R, such as the remote controller of the HA-R, phone, music player, and coordinated left hearing aid (HA-L).

The left HA and/or right HA can be used as conductors in the scenario as shown in FIG. 12.

Figure 13:
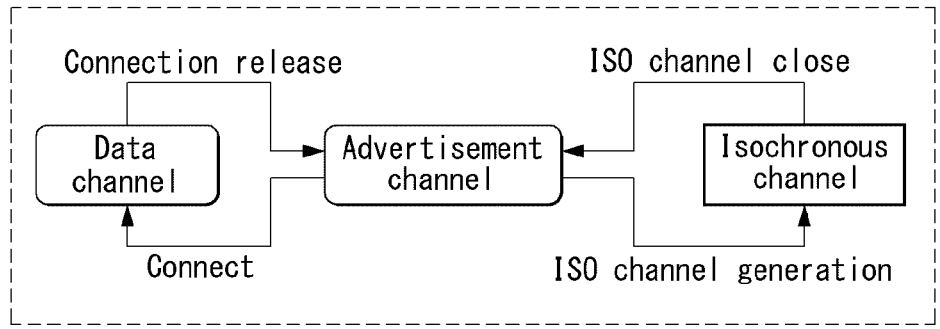
FIG. 13 illustrates one example of an operation state transition according to the BLE technology.

FIG. 13 illustrates one example of an operation state transition according to the BLE technology.

As shown in the figure, an isochronous channel (ISO channel) can operate in conjunction with the advertisement channel and data channel of the BLE technology.

With reference to FIG. 13, a BLE device can change the operation state to a (1) first connected state or a (2) second connected state for transmitting and receiving data while in the advertisement state.

At this time, the first connected state refers to the operation state where the BLE device transmits and received data through a data channel, and the second connected state refers to the operation state where the BLE device transmits and receives data through an isochronous channel.

The BLE device can change its operation state to the first or second connected state depending on the type of data transmitted and received to and from devices or data transmission type.

More specifically, the BLE device generates a data channel from the advertisement channel to operate in the first connected state, while it generates an isochronous channel from the advertisement channel to operate in the second connected state.

Also, if the BLE device changes its operation state to the advertisement state from the first connected state, it releases a generated data channel; if the BLE device changes its operation state to the advertisement state from the second connected state, it releases a generated isochronous channel.

As one example, the BLE device changes its operation state to the second connected state from the advertisement state to transmit and receive audio data. In other words, the BLE device can transmit and receive audio data through the isochronous channel while it is being connected to the second connected state.

Also, the BLE device changes its operation state to the first connected state from the advertisement to transmit and receive data generated in a random fashion or intermittently.

In other words, the BLE device can transmit and receive the corresponding data through the data channel while it is in the first connected state.

As shown in FIG. 13, the BLE device makes a transition from the advertisement state to the first connected state by generating a data channel upon the needs and transmits and receives data through the generated data channel.

When data transmission and reception through the data channel is completed, the BLE device closes the generated data channel and returns to the advertisement state, namely advertisement channel.

In the same manner, the BLE device makes a transition from the advertisement state to the second connected state by generating an isochronous channel upon the needs and transmits and receives data through the generated isochronous channel.

When data transmission and reception through the data channel is completed, the BLE device closes the generated isochronous channel and returns to the advertisement state, namely advertisement channel.

As described above, the isochronous channel is generated for transmitting and receiving data generated at regular intervals, such as audio data while the data channel is generated for transmitting and receiving data irregularly or intermittently.

Figure 14:
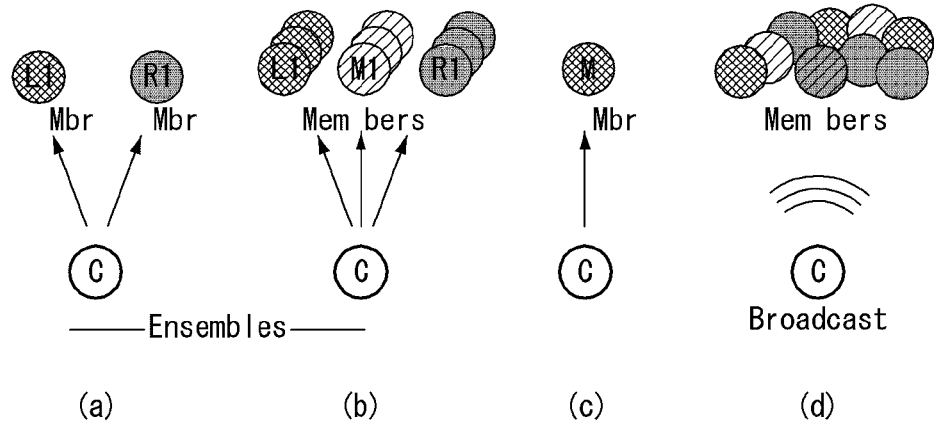
FIG. 14 illustrates various examples of isochronous stream transfer through an isochronous channel.

FIG. 14 illustrates various examples of isochronous stream transfer through an isochronous channel.

FIGS. 14a to 14d show various topologies used for transmitting an isochronous stream, and FIGS. 14a to 14d show conductors establishing isochronous channels with the following member(s).

Two members which may receive the same or different isochronous streams (e.g. a mono, joint stereo or separate left and right audio streams), Three groups of members, with each group synchronized to a separate isochronous stream, A single member receiving a single isochronous stream from a single isochronous channel.

A conductor establishes a plurality of isochronous channels sharing characteristics including an anchor point of the isochronous channel, by which members of the conductor can make the anchor points performed at the same time. These isochronous streams are called an 'ensemble'.

A single isochronous channel which transmits a single isochronous stream to a single member cannot be an example of the ensemble, where such point-to-point topology can be usually described as being operated according to the unicast scheme when it is used for transmission of audio data.

Also, an isochronous channel may be used for broadcasting control information to one or more members, respond to individual broadcast transmission, or selectively request more information.

Through the operation described above, the conductor can operate interactively with respect to a plurality of remote control devices. As shown in FIG. 12, a BLE device may act as a member of the isochronous channel or as a conductor of a different BLE device.

In other words, BLE devices can act as both of the conductor and the member to establish a plurality of isochronous channels.

Figure 15:
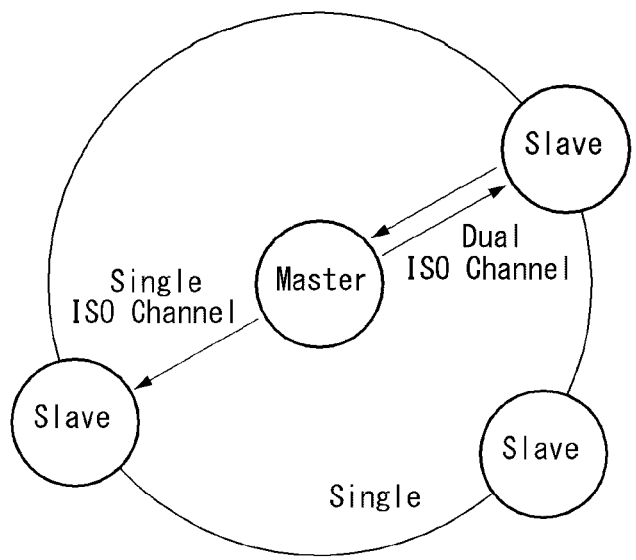
FIGS. 15 and 16 illustrate another example of a data transfer method using an isochronous channel.
Figure 16:
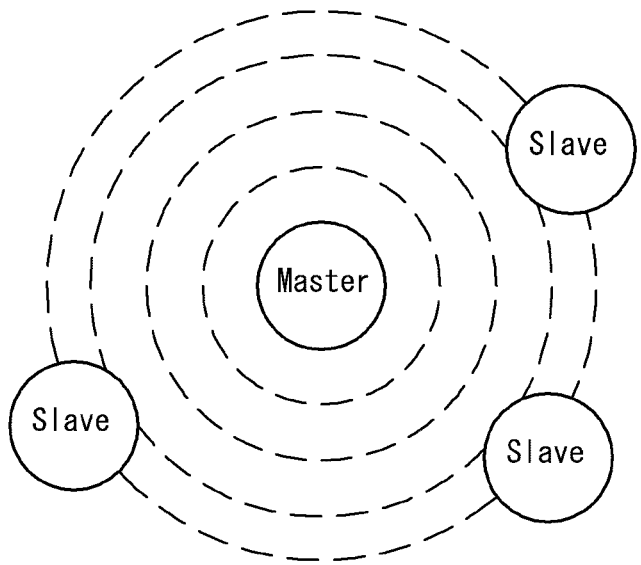

FIGS. 15 and 16 illustrate another example of a data transfer method using an isochronous channel.

More specifically, FIG. 15 illustrates one example of a unicast transmission method, and FIG. 16 illustrates one example of a broadcast transmission method.

First of all, a unicast transmission method through an isochronous channel will be described with reference to FIG. 15.

In the case of unicast transmission, devices can operate an isochronous channel selectively for one or more unicast transmissions.

As shown in FIG. 15, a master can unicast the same or different data to a predetermined number of connected or selected slaves.

Depending on situations, the master may generate a dual isochronous channel to perform bilateral communication with slaves.

In other words, the master can construct a dual isochronous channel by generating a single isochronous channel with one slave and another isochronous channel with the slave.

At this time, generation of a dual isochronous channel may indicate that a downlink isochronous channel and an uplink isochronous channel are generated respectively to realize bilateral communication between one master and one slave, or that isochronous channels are generated among one master and two or more slaves respectively.

Next, broadcast transmission through an isochronous channel will be described with reference to FIG. 16.

As shown in FIG. 16, broadcast transmission through an isochronous channel is performed according to multicast transmission differently from a broadcast transmission method used for most cases (namely a method for transmitting data to all of the devices).

In other words, broadcast transmission through an isochronous channel defined in the BLE specification refers to broadcasting data only to a slave dependent to a generated isochronous channel.

In other words, the master broadcasts data only to approved slaves through an isochronous channel.

Therefore, broadcast transmission through an isochronous channel defined in the BLE specification should be understood as multicast transmission towards a specific group.

Figure 17:
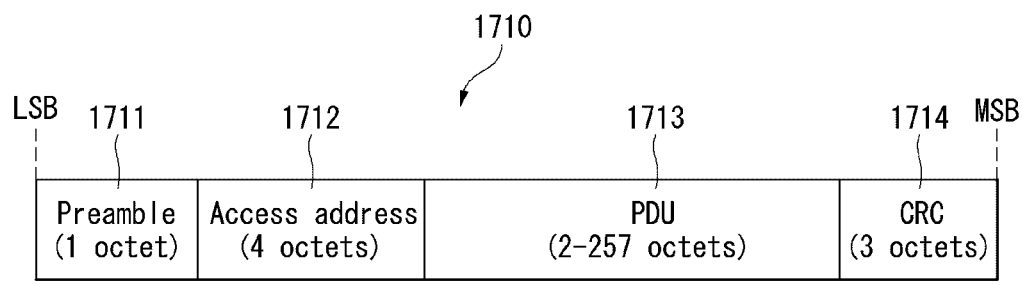
FIG. 17 illustrates examples of isochronous channel packet format which can be applied to the methods of the present invention.
Figure 17:
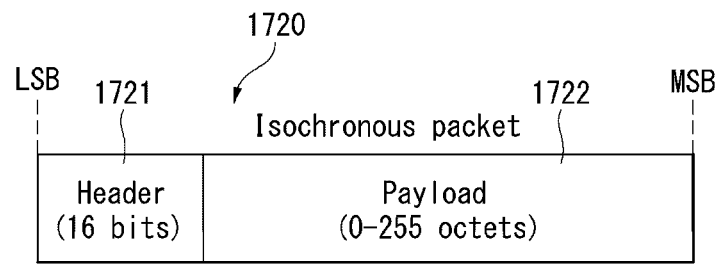

FIG. 17 illustrates examples of isochronous channel packet format which can be applied to the methods of the present invention.

The format of a packet transmitted through an isochronous channel follows the forms shown in FIGS. 17*a* and 17*b*, which is not limited to those in the figure and may assume a form of different format.

As shown in FIG. 17*a*, all of the isochronous channels can have a packet format defined in the Bluetooth specification v4.2 which supports an isochronous data PDU of 2 to 257 octets.

FIG. 17*a* illustrates one example of an extended protocol data unit packet format, and the extended PDU packet format 1710 comprises a preamble 1711, access address 1712, protocol data unit (PDU) 1711, and cyclic redundancy check (CRC) 1714.

The preamble may comprise 1 octet, access address 4 octets, PDU 2 to 257 octets, and CRC 3 octets.

FIG. 17*b* illustrates one example of an isochronous packet, and the isochronous packet (or isochronous channel PDU 1720) can include a header 1721 of 16 bits and payload 1722 of 0 to 255 octets.

Also, the isochronous packet can include a length field of 8 bit size, which is used for checking length of data located next to the header.

The data length of the isochronous packet varies according to the space between isochronous channels and can be limited by a channel parameter imposed by a conductor. Also, the isochronous packet can further include a message integrity check (MIC) field.

Figure 18:
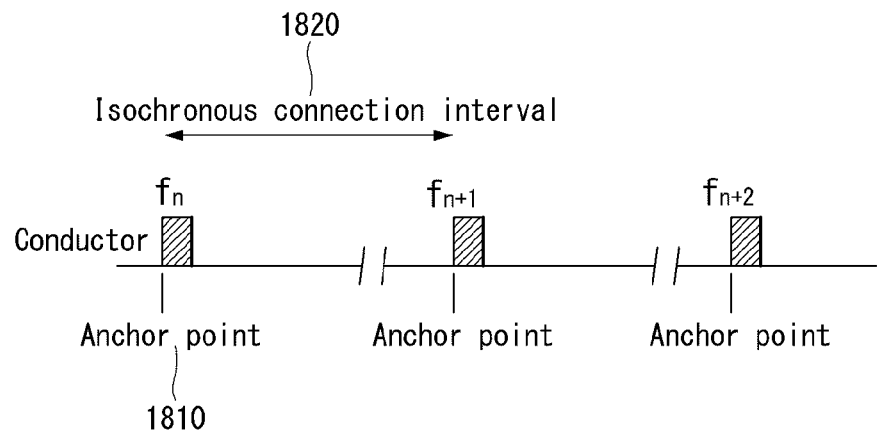
FIG. 18 illustrates one example of a basic format of isochronous channel transfer to which methods according to the present invention can be applied.

FIG. 18 illustrates one example of a basic format of isochronous channel transfer to which methods according to the present invention can be applied.

Isochronous channel timing will also be described with reference to FIG. 18.

A conductor determines timing of all of the packets transmitted through an isochronous channel.

A member, though not capable of directly configuring isochronous channel timing, can provide preferred isochronous channel timing to the conductor.

The conductor establishes (or sets up) an anchor point 1810 which represents the time at which new information is transmitted. As shown in FIG. 18, anchor points are separated from each other by an isochronous connection interval 1820 in the form of a multiple of 1.25 ms (1.25 ms*n, where n is a natural number), and the isochronous connection interval ranges from 5 ms to 318.75 ms.

The isochronous connection interval is defined when the conductor establishes an isochronous connection channel and is fixed while the isochronous connection channel is maintained.

In the isochronous connection interval, another transmission can follow the transmission of the conductor at the anchor point. The follow-up transmission may correspond to retransmission by the conductor and ACK response by the member.

Next, various procedures performed between a source device and an HA (device) and functions related to the procedures will be described.

Since communication between a source device-HA device is the same as or similar to communication between an audio gateway (AW) and a hands-free device, procedures and functions related to communication between a source device and an HA device will be described with reference to a hands free profile (HFP).

In what follows, as procedures and functions related to communication between a source device and an HA device, described will be: (1) a procedure related to service level connection (connection establishment and connection release), (2) a procedure related to audio connection (connection establishment and connection release), and (3) a remote audio volume control function.

Service Level Connection

First, a service level connection procedure between an HA device and a source device will be described.

According to a user action (user input) or an external event, a source device and an HA device initiate a service level connection establishment procedure.

At this time, the service level connection establishment procedure can be initiated by the source device or the HA device.

The source device can be a smartphone, audio gateway (AG), or TV while the HA (device) can be a Bluetooth headset, hands-free (HF) device, or a hearing aid.

For service level connection establishment, RFCOMM connection is required.

At this time, RFCOMM connection indicates that an RFCOMM data link channel is generated (or established or connected) between an HA and a source device.

The RFCOMM connection can indicate existence of a virtual serial port between two devices.

Both of the HA and the source device can initiate RFCOMM connection establishment.

If there is no RFCOMM connection (or session) between the source device and the HA, an initiating device first initiates RFCOMM connection for a corresponding device.

The service level connection establishment procedure can be largely divided into (1) a service level connection initialization procedure and (2) a link loss recovery procedure.

The service level connection initialization procedure includes supported features exchange and ii) codec negotiation between two devices.

For the case of the link loss recovery procedure, link loss recovery performed only in an HA will be described.

In other words, in case a Bluetooth link (or Bluetooth connection) to a source device is lost, the HA can re-establish a Bluetooth link to the source device any time.

And in case a service level connection between two devices is released by an explicit termination command of either of the two devices, the two devices wait for an explicit user action, namely a user input commanding a re-establishment procedure for service level connection before re-establishment of the corresponding service level connection is performed by a specific attempt.

Audio Connection Setup

Next, an audio connection setup procedure will be described.

According to a user action or an external event, an HA or a source device can initiate establishment of audio connection. However, the corresponding audio connection establishment procedure can be performed depending on the needs.

The HA and the source device can initiate audio connection for both of a case with a call process and a case without a call process.

The audio connection setup procedure always indicates establishment of synchronous connection and is related to always-existing service level connection.

Therefore, as a precondition for performing the audio connection setup procedure, existence of an on-going service level connection between two devices is required.

In case on-going service level connection does not exist, an initiating device initiating the audio connection setup procedure first establishes service level connection with a corresponding device (or accepting device) by using an appropriate procedures automatically.

Both of the initiating device and the accepting device notify their corresponding device of existence of new audio connection.

If the source device configures audio connection and both of the two devices are found to support features related to the audio connection through a service level negotiation procedure, a codec connection establishment procedure is initiated.

Also, if both of the two devices support codec negotiation features and the HA initiates the corresponding audio connection establishment procedure, the HA triggers the source device to establish codec connection.

This is so because the source device is informed of selected codec to be used and network configuration.

Codec Connection Setup

According to a user action or an external event, an HA or a source device can initiate establishment of codec connection setup with a corresponding device any time in case of need.

Although initiation of audio connection can be triggered by a source device or an HA, synchronized connection with codec connection is established by being always initiated by the source device.

Also, both of the two devices support code negotiation features, and in case service level connection is established between the two devices, the HA can transmit a specific signal (AT+BAC) to the source device to notify of dynamic change in a set of available codecs.

Through the aforementioned operation, update of available codecs are performed.

Answer an Incoming Call

In case an incoming call is received from the outside, a source device transmits a sequence of unrequested RING alerts to an HA.

A RING alert is transmitted repeatedly until call acceptance is pending or an incoming call is suspended for some reason.

The HA generates local alerting in response to the RING.

Also, the source device can drop an incoming call if needed.

In this case, the source device stops transmitting a RING alert to the HA.

Selectively, the source device can generate an in-band ring tone.

If an in-band ring tone is used, the source device transmits a ring tone to the HA through an established audio connection.

Three-Way Call Handling

Next, a three-way call handling method will be described.

An HA (device) is not capable of always recognizing whether 'call hold and/or multiparty' services are available in a network.

In case a source devices determines that a behavior requested by the HA device cannot be performed since a network supporting the corresponding feature is incapable of handling the behavior or the behavior cannot be performed since no subscriber is found, the source device returns +CME error signal to the HA device.

The network uses two +CME error codes (30-No network service, 31-Network Timeout) to indicate sources of related failures to the HA device.

As described below, two preconditions are applied to perform the three-way calling procedure.

First, there should exist an on-going service level connection between the source device and the HA device.

In case there does not exist the corresponding service level connection, an initiating device of the corresponding connection automatically establishes the corresponding service level connection by using a relevant procedure.

Second, there should exist an on-going call in the source device.

Besides the two preconditions, a call waiting notification condition is required for three-way calling.

Call waiting notification is already enabled from the source device to the HA device.

A specific procedure of three-way calling is as follows.

First, the source device and the HA device establish a service level connection.

At this time, an audio connection can be established selectively between the source device and the HA device.

It is assumed that there is an on-going call between the source device and the HA device.

Also, it is further assumed that the HA device is enabled with call waiting notification.

Recognizing that a call from the outside is waiting, the source device notifies the HA device of the incoming call.

Through the notification, the HA indicates so that the user can know existence of a new waiting call.

According to the user's behavior, the HA device accepts a waiting call and notifies the source device of the acceptance.

Afterwards, the source device accepts the waiting call.

At this time, if a three-way handling function is allowed, the source device transmits an OK signal to the HA device, and if the corresponding function is not allowed or supported, the source device transmits an ERROR signal to the HA device.

If the source device transmits (or returns) an ERROR signal, subsequent procedures are not performed any more.

Also, in case there is no audio connection with the HA device, the source device initiates establishment of audio connection with the HA device.

Through the initiation, audio paths to a new call can be made available for the HA device.

And the audio paths indicate that an audio connection has been established between the HA device and the source device.

Through the audio paths established, a new call is routed to the HA device.

Next, a procedure for the HA device to place a call on a third party will be described.

First, the HA device and the source device establish a service level connection.

Audio connection between the two devices can be established selectively.

Afterwards, the HA device transmits to the source device a signal for transferring a call to a third party according to the user's behavior.

Next, the source device holds a current call and performs a set-up procedure of an outgoing call to the third party.

In case the set-up procedure of the outgoing call to the third party is performed successfully, an audio connection with respect to a new call is established between the HA device and the source device.

In case an audio connection to the new call already exists, the corresponding audio connection establishment procedure can be omitted.

In other words, signals are routed to the HA device through audio paths to the new call.

At this time, the new call can indicate a call with respect to the third party.

Remote Audio Volume Control

Next, a remote audio volume control function carried out between an HA device and a source device will be described.

The remote audio volume control function refers to the function for the user to change speaker volume of the HA device or microphone gain through the source device.

In other words, in case the source device transmits a signal related to setting up microphone gain or speaker volume to the HA device, the HA device changes microphone gain or speaker volume according to a received signal.

Before the corresponding function is performed, the source device and the HA device can perform a volume level synchronization procedure.

In other words, the HA device informs the source device of the current gain setting corresponding to the HA device's speaker volume and microphone gain.

The aforementioned operation can be performed through the service level connection establishment procedure between the source device and the HA device.

In what follows, a state machine related to an HA according to the present invention will be newly defined and described will be a method for call control, audio stream control, and transmitting and receiving an audio stream.

The state machine described in this document defines states that a device can have, and each state represents a function that the device can operate or perform.

In other words, the state machine is a conceptual drawing illustrating a state changed according to transmission/reception of a specific signal or a specific operation, which can be called a state diagram.

An HA (Hearing Aid), HA device in this document can be interpreted in the same manner to perform a method according to the present invention.

Also, the HA according to the present invention can be expressed as a Bluetooth headset or an earbud.

At this time, a Bluetooth headset can be realized by the type combining left and right devices and the type separating left and right devices.

In other words, a Bluetooth headset may be a Bluetooth device in the form of combining left and right devices into a single device or a Bluetooth device in the form of separating left and right devices.

Also, an earbud may be a Bluetooth device in the form of separating left and right devices.

In what follows, for the convenience of description, the aforementioned hearing aid, Bluetooth headset, and earbud are called collectively 'HA', the implication of which can be interpreted as described above and is not limited by the corresponding terminology.

Currently, a state machine is not defined for HAs, and HA-related profile or standard does not consider defining a state machine, either.

A user device (for example, phone) acquires HA UI control and interprets a user action to appropriate command/response based on the context in the user device.

The HA can transmit a request signal to the user device to initiate a specific action or change an application to use through the HA UI.

Figure 19:
FIG. 19 illustrates one example of a method for transmitting and receiving a signal between a user device and an HA to which a method of the present invention can be applied.

FIG. 19 illustrates one example of a method for transmitting and receiving a signal between a user device and an HA to which a method of the present invention can be applied.

With reference to FIG. 19, the user device includes a state machine and is capable of performing a specific motion at each state of the state machine.

Also, the user device can make state transition from one state to another based on transmission/reception of a specific signal.

Also, the HA can transmit a command signal to the user device according to a user action.

Next, state machine handling location will be described.

The state machine can be processed by the user device side of the HA profile.

Or the state machine may not be processed in any side (user device/HA) of the HA profile.

In this case, the state machine can be processed by a third device.

However, (state) transition should be monitored by the HA profile through event notification.

At this time, (state) transition can be interpreted as a state event or state change event.

However, it is more preferable that the state machine is located in the user device side. It is so because complexity due to monitoring an event can be reduced.

Next, application mode change will be described.

Application mode change can be performed by the HA or user device.

In case the application mode change is performed in the HA-side, the HA user can invoke a command for the HA to perform application mode change.

Figure 20:
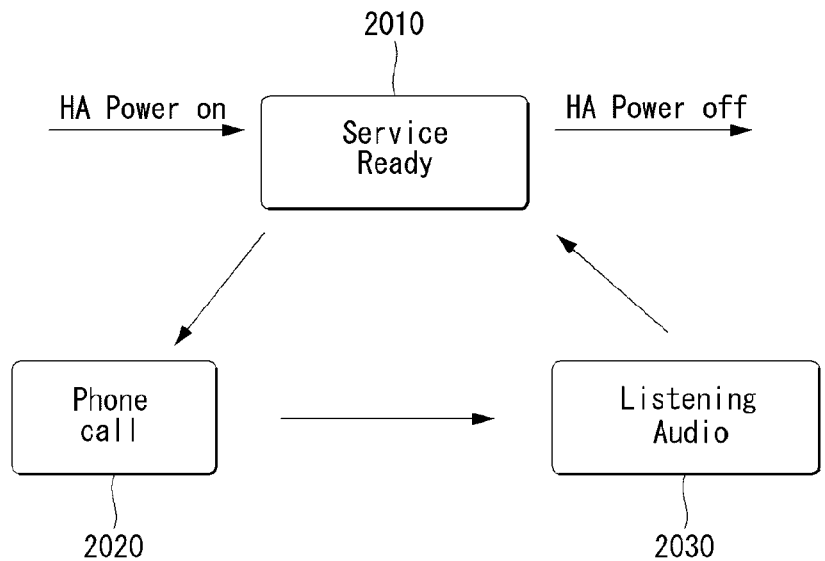
FIG. 20 illustrates one example of application mode change according to the present invention.

FIG. 20 illustrates one example of application mode change according to the present invention.

With reference to FIG. 20, if HA is powered on, the HA enters a service ready state 2010.

While in the service ready state, the HA can perform a phone call with a user device.

Also, the HA can make state transition (or switching) from a phone call state 2020 to audio listening state 2030 and from audio listening state to the service ready state.

Also, if the HA is powered on while it is in the service ready state, the HA makes state transition to the initial state.

The HA can listen to or receive an alert sound such as a smoke alarm any time.

In this case, the alert sound or alert signal can have a higher priority than other application or other services.

Figure 21:
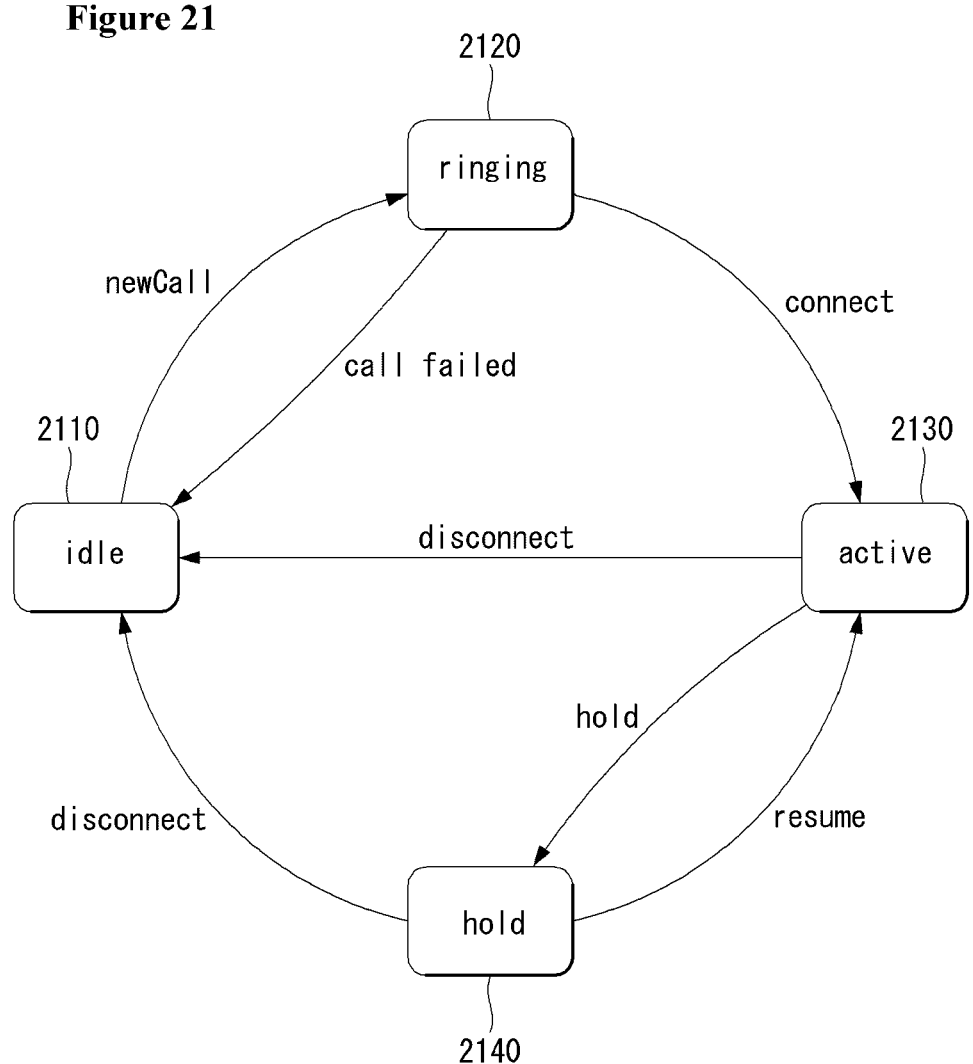
FIG. 21 illustrates one example of a state machine related to call control according to the present invention.

FIG. 21 illustrates one example of a state machine related to call control according to the present invention.

With reference to FIG. 21, the state machine related to call control can be defined by four states.

In other words, the four states can be idle 2110, ringing 2120, active 2130, and hold 2140.

First, the idle state refers to the state where Bluetooth communication is ready and a Bluetooth command can be transmitted/received, but Bluetooth operations are not started yet.

The active state corresponds to a state where a BLE audio stream transfer channel (for example, isochronous channel) is opened by a specific request, and an audio stream can be transmitted and received.

At this time, the state where an audio stream transfer channel (for example, isochronous channel) is open can indicate a state where an audio stream transfer channel is newly connected/established.

The active state indicates a state where a device is performing a phone call, playing music, or playing a doorbell/public announcement by the request of a phone/music/doorbell/public announcement.

Also, the activating state described later corresponds to an intermediate state where a BLE audio stream transfer channel (isochronous channel) is opened to move from the idle state to the active state and can correspond to a state before a correspondent receives a phone call with respect to an outgoing call or a state where a bell/vibration is rung/activated with respect to an incoming call.

Application examples that can be applied to the state machine defined in this document can include phone, music play, doorbell, smoke alarm, and navigation alert during driving.

Table 2 below illustrates cases considered with respect to state transition of FIG. 21.

TABLE 2

| Transition | Cases considered in transition |
|---|---|
| New call | receiving incoming call |
| | initiating outgoing call |
| Call failed | remote busy after try outgoing call |
| | Cancel outgoing call |
| | Reject incoming call |
| Connect | Accept incoming call |
| | Outgoing call connected |
| Disconnect | local disconnect |
| | Remote disconnect |
| | Disconnect from call hold |
| hold | receiving emergency alarm during the phone call |
| | call hold for 3-way call (outgoing case) |
| | call hold for receiving new call (incoming case) |
| Resume | Resume can be done from hold state |
| Volume adjust | Volume adjust can be done anytime |

Also, all of the features defined in the hands-free profile (HFP) can be applied to all of the features of the method proposed in this document.

Figure 22:
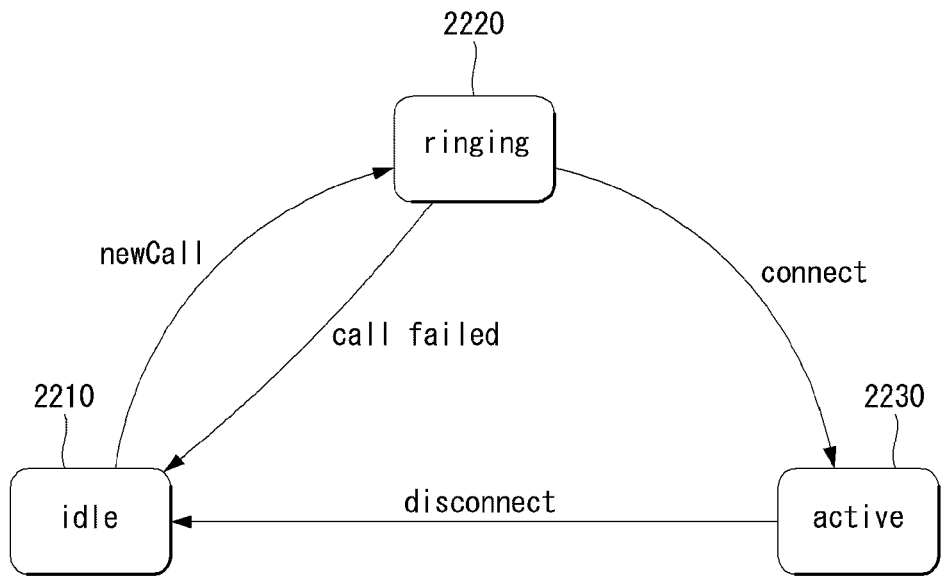
FIG. 22 illustrates one example of a simple state machine related to call control according to the present invention.

FIG. 22 illustrates one example of a simple state machine related to call control according to the present invention.

In other words, FIG. 22 is a simplified version of the state machine defined in FIG. 21, and the state machine of FIG. 22 can be defined by three states: idle state 2210, ringing state 2220, and active state 2230.

Individual states are related to initiating an outgoing call, canceling an outgoing call, rejecting an incoming call, accepting an incoming call, and releasing connection of a local call.

Table 3 below illustrates cases considered with respect to state transition of FIG. 22.

TABLE 3

| Transition | Cases considered in transition |
|---|---|
| New call | receiving incoming call |
| | initiating outgoing call |
| Call failed | remote busy after try outgoing call |
| | Cancel outgoing call |
| | Reject incoming call |
| Connect | Accept incoming call |
| | Outgoing call connected |
| Disconnect | local disconnect |
| | Remote disconnect |
| | Disconnect from call hold |

Table 4 below illustrates cases of HA user action corresponding to the cases considered with respect to state transition.

TABLE 4

| Transition | Cases considered in transition | action example |
|---|---|---|
| New call | receiving incoming call | No action needed; sound alert to user |
| | initiating outgoing call | short button press for calling |

TABLE 4-continued

| Transition | Cases considered in transition | action example |
|---|---|---|
| Call failed | remote busy after try outgoing call Cancel outgoing call Reject incoming call | to last call or calling from smartphone No action needed; Sound alert to user short button press before call connected |
| Connect | Accept incoming call Outgoing call connected | Long button press short button press No action needed after trying call |
| Disconnect | local disconnect Remote disconnect Disconnect from call | Short button press No action needed |
| hold | hold receiving emergency alarm during the phone call call hold for 3-way call (outgoing case) call hold for receiving new call (incoming case) | Long button press No action needed No action needed in HA; handled in smartphone Short button press for receiving incoming call; call hold feature set by configuration in advance |
| Resume | Resume can be done from hold state | Short button press |
| Volume adjust | Volume adjust can be done anytime | Rocker switch |

It can be seen from the table that three types of user inputs are required to perform state transition of FIG. 22.

As described above, the three types of user inputs can be short button press, long button press, and rocker switch, and the three types of user inputs can be optimized by manufacturers.

Next, a state machine employed for transmitting and receiving an audio stream between a user device and an HA will be described.

Figure 23:
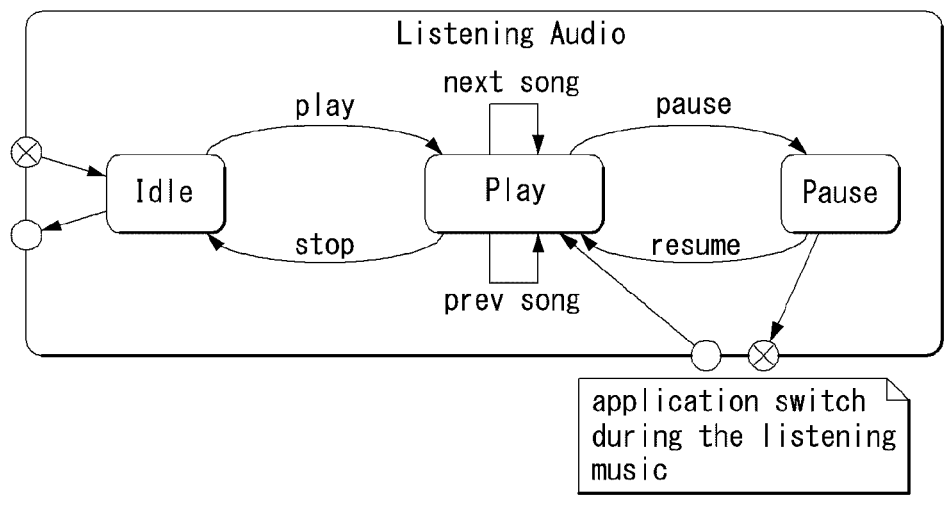
FIG. 23 illustrates one example of a state machine related to a control function in case an audio stream is transmitted and received according to the present invention.
Figure 23:
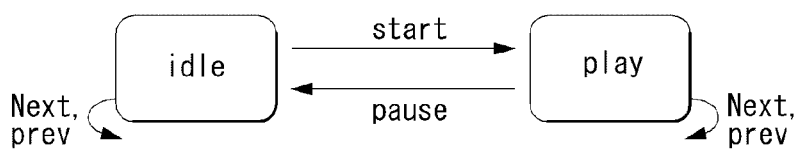

FIG. 23 illustrates one example of a state machine related to a control function in case an audio stream is transmitted and received according to the present invention.

FIG. 23a shows one example of a state machine including three states: idle, play, and pause, while FIG. 23b illustrates one example of a simplified state machine including two states: idle and play.

FIGS. 23a and 23b assume that an audio stream is transmitted or received or an HA listens to an audio signal.

With reference to FIG. 23a, the HA makes transition from the idle state to the play state according to a play control signal related to initiation of transmission and reception of an audio stream and makes transition to the idle state from the play state according to a stop control signal related to termination of transmission and reception of an audio stream.

Also, while in the play state, the HA can perform a function with respect to the next song or previous song through a specific control signal, and the HA stays in the play state when the corresponding function is performed.

Also, the HA makes transition to the pause state from the play state according to a pause control signal related to pausing (or stopping) transmission and reception of an audio stream, and the HA makes transition to the play state from the pause state according to a resume control signal related to resuming transmission and reception of an audio stream stopped in the pause state.

Table 5 illustrates examples of HA user actions corresponding to state transition according to FIG. 23.

TABLE 5

| Transition | HAs user action example |
|---|---|
| Play | Short button press |
| Stop | No need to handle (can be treated as pause) |
| Pause | Short button press |
| Resume | No need to handle (same as play) |
| Next song | Rocker switch up button press twice |
| Prev.song | Rocker switch down button press twice |
| Volume adjust | Rocker switch |

With reference to FIG. 23b, the HA makes transition to the play state from the idle state according to a start control signal related to initiation of transmission and reception of an audio stream and makes transition to the idle state from the play state according to a pause control signal related to pausing transmission and reception of an audio stream.

Also, the HA can perform the function of playing the next song and previous song while in the idle and play state respectively.

It can be seen that 4 types of user inputs are required to perform state transition of FIG. 23.

As described above, the 4 types of user inputs can be short button press, rocker switch up (or down) button press twice, and rocker switch.

Next, a state machine related to transmission and reception of an (audio) stream will be described.

The HA profile uses features defined by AASG for audio stream control.

The HA profile can include a simple content control mechanism for audio listening.

At this time, audio listening can include audio play, pause, and moving to the next song/previous song.

Figure 24:
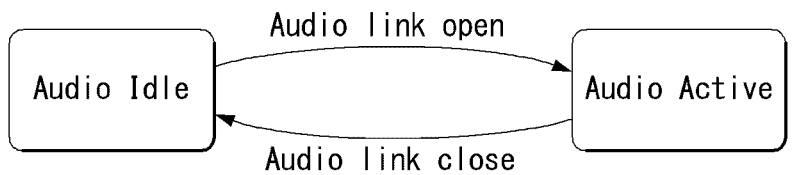
FIG. 24 illustrates one example of a state machine with respect to an audio link state according to the present invention.

FIG. 24 illustrates one example of a state machine with respect to an audio link state according to the present invention.

As shown in FIG. 24, audio link state can include an audio idle state and an audio active state.

If the state is changed to the audio active state from the audio idle state, the audio link state becomes open while the audio link state becomes close if the state switches from the audio active state to the audio idle state.

TABLE 6

| State | Description |
|---|---|
| Idle | Idle state means that Audio Link is not opened between HAs and audio source such as phone, TV and media player. |
| Active | Active state means call connected and HA user is talking with peer phone user. In this state the active call may disconnected by local or remote user. When receiving the Emergency Alert event in this state, active call shall be switched to hold state without user intervention. And after the Emergency Alert finished, call state shall be switched back to the previous Active state. |

Next, a case considering both of call control and audio stream handling will be described.

Figure 25:
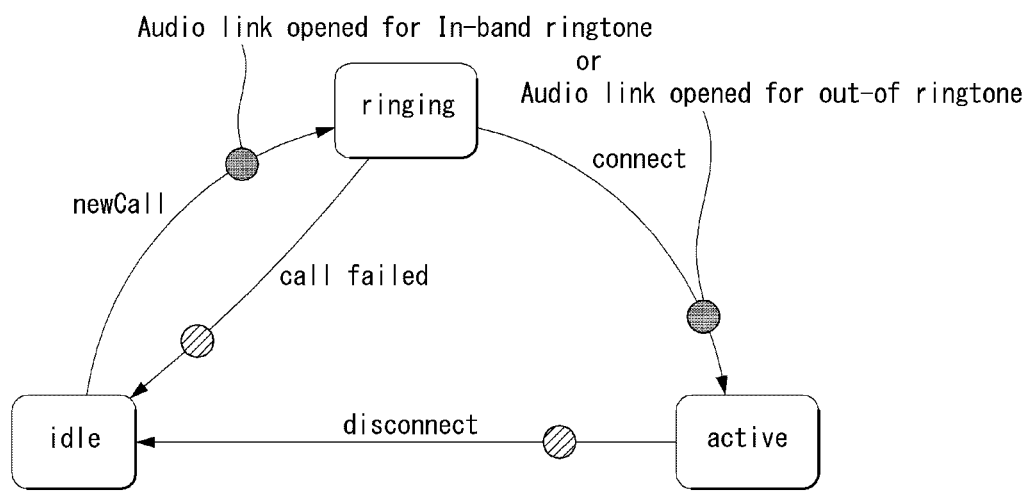
FIG. 25 illustrates another example of a state machine according to the present invention.

FIG. 25 illustrates another example of a state machine according to the present invention.

With reference to FIG. 25, the state machine includes three states, namely idle state, ringing state, and active state.

If a new call is coming, the state machine changes its state from the idle state to the ringing state; if a call-failed occurs, the state machine changes its state from the ringing state to the idle state.

In other words, if a call-failed occurs, the audio link is closed 2520.

Also, the audio link is opened 2510 through state transition from the idle state to the ringing state with respect to an in-band ringtone, and the audio link is opened with respect to an out-band ringtone through state transition from the ringing state to the active state.

TABLE 7

|  | In-band RingTone | Out-of-band RingTone |
| --- | --- | --- |
| Idle | Audio link close | Audio link close |
| Ringing | Audio link open | Audio link close |
| Active | Audio link open | Audio link open |
| Hold | C1 | C1 |

In Table 7, in-band ringtone and out-of-band ringtone correspond to the audio link state, while idle/ringing/active/hold correspond to the phone call state.

Next, a case considering both of audio listening control and audio stream handling will be described.

Figure 26:
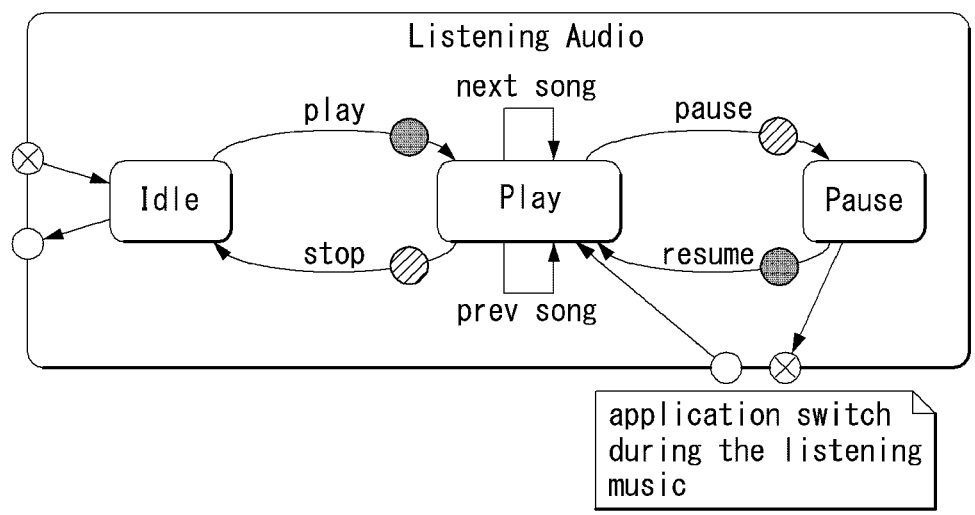
FIG. 26 illustrates a yet another example of a state machine according to the present invention.
Figure 26:
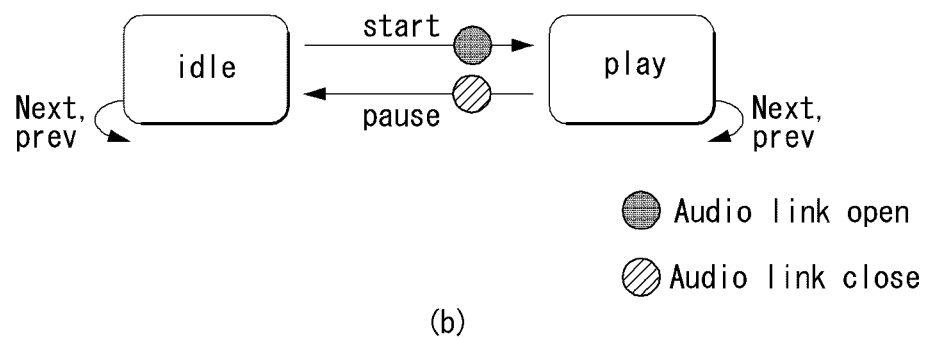

FIG. 26 illustrates a yet another example of a state machine according to the present invention.

In other words, FIG. 26 illustrates a state machine applied to a method for performing audio listening control while transmitting and receiving an audio stream.

FIG. 26a illustrates one example of a state machine including three states: idle, play, and pause, and FIG. 26b illustrates one example of a state machine in a simplified version including two states: idle and play.

FIGS. 26a and 26b assume transmission and reception of an audio stream or listening to an audio signal.

With reference to FIG. 26a, the state machine makes transition from the idle state to the play state according to a play control signal related to initiation of transmission and reception of an audio stream and makes transition from the play state to the idle state according to a stop control signal related to stopping transmission and reception of an audio stream.

Also, a function with respect to moving to the next song or previous song can be performed through a specific control signal while the state machine is in the play state, and when the corresponding function is performed, the play state is maintained.

Also, the state machine makes transition from the play state to the pause state according to a pause control signal related to pausing (or stopping) transmission and reception of an audio stream and makes transition from the pause state to the play state according to a resume control signal related to resuming transmission and reception of an audio stream.

With reference to FIG. 26b, the state machine makes transition from the idle state to the play state according to a start control signal related to starting transmission and reception of an audio stream and makes transition from the play state to the idle state according to a pause control signal related to pausing transmission and reception of an audio stream.

Also, the function of moving to the next song and previous song can be performed while the state machine is in the idle and play state respectively.

TABLE 8

| State | Isochronous channel on/off |
| --- | --- |
| Idle | Audio link close |
| Play | Audio link open |
| Pause | Audio link close |

Figure 27:
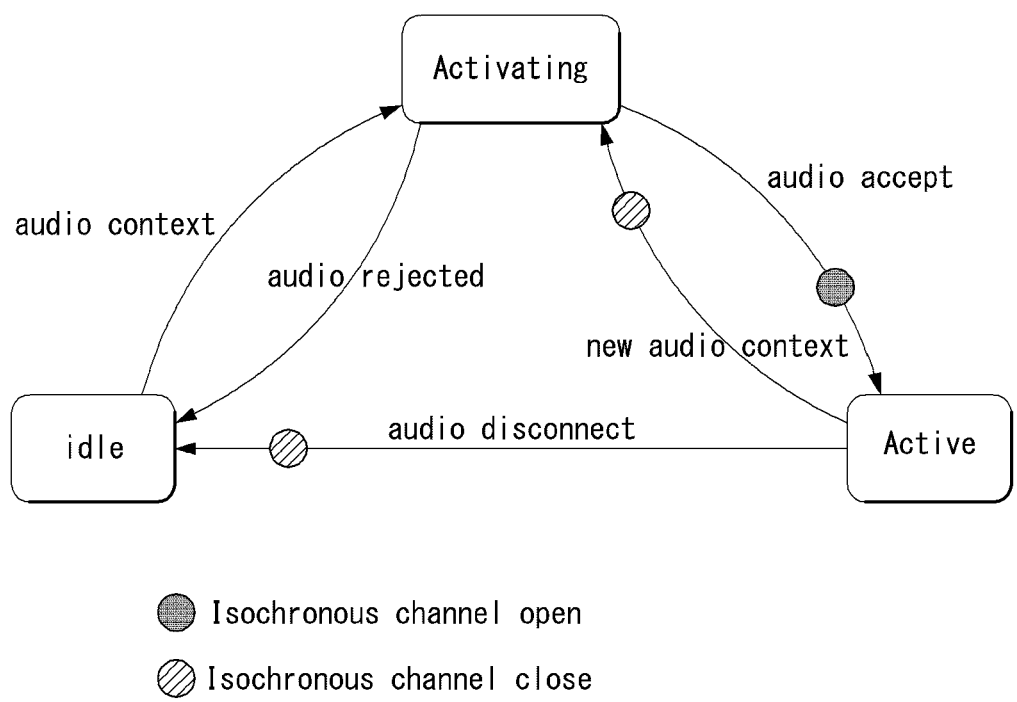
FIG. 27 illustrates a still another example of a state machine according to the present invention.

FIG. 27 illustrates a still another example of a state machine according to the present invention.

In other words, the state of a state machine of FIG. 27 represents call control, audio streaming control, and audio stream on/off operation (or function) described earlier.

At this time, call control represents control of an outgoing or incoming call; audio stream control represents control of audio streaming for audio listening; and audio stream on/off represents establishing/releasing connection of an audio stream.

As shown in FIG. 27, an isochronous channel is open when the state machine makes transition from the activating state to the active state, and an audio accept signal is transmitted and received through the corresponding isochronous channel.

Also, the isochronous channel is closed when the state machine makes transition from the activating state or active state to the idle state, and new audio context and audio disconnect are performed respectively.

In this document, for the convenience of description, the present invention has been described according to the respective drawings; however, it is equally possible to design a new embodiment by merging the embodiments described in the respective drawings. Also, depending on the needs of those skilled in the art, designing a computer-readable recording medium in a computer storing a program for running the embodiments previously described also belongs to the technical scope of the present invention.

A method for transmitting and receiving an audio stream according to the present invention is not limited to the embodiments described above, but the entire embodiments can be combined or part of the embodiments can be combined selectively so that various modifications can be made to the embodiments.

Meanwhile, a method for transmitting and receiving an audio stream according to the present invention can be implemented in the form of processor-readable program codes in a recording medium that can be read by a processor installed in a network device. The processor readable recording medium includes all kinds of recording devices storing data that can be read by the processor. Examples of processor-readable recording media include ROM, RAM, CD-ROM, magnetic tape, floppy disk, optical data storage device, and implementation in the form of carrier waves such as transmission through the Internet. Also, the processor-readable recording medium can be distributed across computer systems connected to each other through a network, and program codes that can be read by the processor can be stored and run in a distributed manner.

Throughout the document, preferred embodiments of the present invention have been described with referenced to appended drawings; however, the present invention is not limited to the embodiments above. Rather, it should be noted that various modifications of the present invention is made by those skilled in the art to which the present invention belongs without leaving the technical scope of the present invention defined by the appended claims, and these modifications should not be understood individually from the technical principles or aspects of the present invention.

This document describes both of the product invention and process invention, and depending on the needs, descriptions of both inventions can be applied in a complementary manner.

This document discloses a method for transmitting and receiving an audio stream in a wireless communication system.

What is claimed is:

1. A method for transceiving audio streams in a wireless communication system, the method performed by a first device and comprising:
    performing an audio link connection procedure related to transceiving an audio stream with a second device, the audio link including at least one isochronous channel;
    transceiving the audio stream to and from the second device through the at least one isochronous channel;
    transmitting a command message to the second device to perform a specific function related to the audio stream, wherein the specific function includes at least one of a first control function related to an incoming call or an outgoing call, a second control function related to audio listening, or a third control function related to audio stream handling;
    receiving an alert sound having a highest priority through the at least one isochronous channel; and
    increasing power with respect to the alert sound in case the audio stream and the alert sound are received simultaneously through the at least one isochronous channel.

2. The method of claim 1, wherein state of the first device or the second device undergoes state transition from a first state to a second state according to the specific function.

3. The method of claim 2, wherein the first or the second state includes an idle state, activating state, and active state.

4. The method of claim 1, wherein the alert sound is received in an idle state, an activating state, or an active state.

5. The method of claim 1, wherein the second control function is audio play, audio stop, audio pause, audio resume, move to a next song, move to a previous song, or volume adjust, and
    wherein the third control function is audio link connection or audio link release.

6. The method of claim 1, wherein the audio link is established for in-band ringtone or out-of-band ringtone.

7. The method of claim 1, wherein the first device is a Hearing Aid (HA), and the second device is a user device.

8. A first device for transceiving audio streams in a wireless communication system, the first device comprising:
    a radio frequency (RF) unit configured to transceive a signal in a wired and/or wireless manner; and
    a processor functionally connected to the RF unit, wherein the processor is configured to:
        perform an audio link connection procedure related to transceiving an audio stream with a second device, the audio link including at least one isochronous channel;
        transceive the audio stream to and from the second device through the at least one isochronous channel;
        transmit a command message to the second device to perform a specific function related to the audio stream, wherein the specific function includes at least one of a first control function related to an incoming call or an outgoing call, a second control function related to audio listening, or a third control function related to audio stream handling;
        receive an alert sound having a highest priority through the at least one isochronous channel; and
        increase power with respect to the alert sound in case the audio stream and the alert sound are received simultaneously through the at least one isochronous channel.

* * * * *